United States Patent [19]

Francis et al.

[11] Patent Number: 5,001,650

[45] Date of Patent: Mar. 19, 1991

[54] METHOD AND APPARATUS FOR SEARCH AND TRACKING

[75] Inventors: W. Leon Francis, Redondo Beach; Paul T. Gray, Fountain Valley; Walter G. Margerum, Gardena, all of Calif.

[73] Assignee: Hughes Aircraft Company, Los Angeles, Calif.

[21] Appl. No.: 335,659

[22] Filed: Apr. 10, 1989

[51] Int. Cl.$^5$ .................. H04N 7/18; G06F 15/00
[52] U.S. Cl. .................... 364/516; 358/113; 356/152
[58] Field of Search ........... 364/516, 517, 449, 525, 364/423, 572; 356/5, 152; 358/107, 113; 250/332, 333; 244/3.16; 382/28

[56] References Cited

U.S. PATENT DOCUMENTS

| | | | |
|---|---|---|---|
| 4,034,401 | 7/1977 | Mann | 358/113 |
| 4,091,414 | 5/1978 | Chow | 358/113 |
| 4,267,562 | 5/1981 | Raimondi | 358/109 |
| 4,328,516 | 5/1982 | Colpack et al. | 358/113 |
| 4,419,692 | 12/1983 | Modisette et al. | 250/332 |
| 4,612,441 | 9/1986 | Pardes et al. | 250/342 |
| 4,881,270 | 11/1089 | Knecht et al. | 382/28 |

OTHER PUBLICATIONS

Van Atta; "Army Protype Automatic Target Screener", SPIE vol. 137; 1978.
Blackman, Samuel S., *Multiple Targeting With Radar Applications*, Artech House, Dedham, MA (1986), pp. 281–305, 402–421.

*Primary Examiner*—Parshotam S. Lall
*Assistant Examiner*—Ellis B. Ramirez
*Attorney, Agent, or Firm*—William J. Streeter; Wanda K. Denson-Low

[57] ABSTRACT

A method and apparatus for search and tracking multiple targets in an object space. The apparatus (10) includes a targeting FLIR unit (12) operating in imaging mode. The targeting FLIR unit (12) is operable to generate an output in response to the observations of the multiple targets. The apparatus (10) also includes an infrared search and tracking electronics unit (48) for allowing the apparatus (10) to detect and track the multiple targets in response to the output of the targeting FLIR unit (12).

30 Claims, 22 Drawing Sheets

| TARGET DELAY, µS | GUARD GAIN SETTING | W₁ AT CROSSOVER | |
|---|---|---|---|
| | | µS | MRAD |
| 80 | 1.25 | 182 | 1.14 |
| 80 | 1.50 | 135 | 0.85 |
| 80 | 1.75 | 112 | 0.70 |
| 100 | 1.25 | 246 | 1.55 |
| 100 | 1.50 | 192 | 1.21 |
| 100 | 1.75 | 157 | 0.99 |

Fig. 15

METHOD AND APPARATUS FOR SEARCH AND TRACKING

BACKGROUND OF THE INVENTION

1. Field of the Invention

This invention relates to the field of infrared sensing, and more particularly concerns a method and apparatus for wide area target search and tracking.

2. Description of Related Art

Elemental infrared detectors are often used in surveillance, target seeking, and search and tracking imaging systems to sense the presence of electromagnetic radiation with wavelengths from 1-30 $\mu$m. To detect infrared radiation, these elemental detectors often use temperature sensitive pyroelectric and ferroelectric materials such as triglicine sulfate and lanthanum doped lead zirconate titanate. Such crystals exhibit spontaneous electrical polarization in response to incident infrared radiation which creates a potential drop across electrodes attached to the crystals. Photoconductive materials such as lead-sulfide and mercury-cadmium-telluride may also be used in which the resistance of the material changes as a function of incident radiation. Finally, photovoltaic devices such as those fabricated from mercury-cadmium-telluride, indium antimonide, or similar materials may be used for infrared detection using a standard P/N junction where intrinsic band-to-band electron-hole excitation generates a current or voltage which is proportional to the incident radiation flux.

Arrays of such elemental detectors may be used to form thermal imaging systems or sensors. In real time thermal imaging systems such as forward looking infrared ("FLIR") imaging sensors, oscillating prism mirrors are used to scan radiation emitted by a source across a one-dimensional array of elemental detectors. When the elemental detectors are used in this manner, the temporal outputs of the detectors may be used to generate a two-dimensional representation of the image. In two-dimensional detector array imaging systems, which can utilize either staring or scanning arrays, the elemental detectors produce free charge carriers or currents which may then be monitored by an appropriate read-out integrated circuit such as a charge-coupled device ("CCD"). The output from the CCD can be processed by various techniques such as time delay and integration and parallel-to-serial scan conversion, with the choice depending on the system requirements of frame rate, signal-to-noise ratios, etc. It should be understood, however, that other types of readout devices may also be used.

Using such sensing devices, targets or other objects can be searched for and detected by means of the infrared radiation which that target emits. The search is typically conducted by either moving the sensor field-of-view over the projected target search area, or by having a sensor whose field of view is large enough to completely cover the target search area. In the former case, the sensor is often referred to as a gimballed or turreted sensor or FLIR. Following search and detection, the gimballed FLIR can track the target in any of several ways. Two of the most common methods for purposes of the present discussion are (1) imaging track, in which the imaging FLIR sensor line of sight is positioned on the target and maintained there or tracked in the presence of all motion, and (2) track-while-scan ("TWS") mode, in which the FLIR is moved in the search area according to a scheduled pattern and track history is maintained in a separate data processor which records, analyzes, and correlates all detections. The TWS mode is well suited to wide area search and track of multi-targets.

The chief disadvantage of using FLIR based imaging systems in the TWS mode is that such systems had to operate in a very slow search mode to prevent blurring during manual observation, or in a slow step-stare mode for manual observation of the display and for automatic target detection/recognition processing. Accordingly, imaging trackers using these approaches either were generally not capable of continuously tracking a rapidly moving object or multiple targets or required the operator to view fragments of the changing scene rather than continuously viewing the scene as it changed. While some effort was directed toward developing specific sensor designs with a specific focal plane so that they could scan a wide field-of-view more quickly, such systems did not generally incorporate a gimballed common-module FLIR as presently used in a relatively large number of applications.

SUMMARY OF THE INVENTION

A method and apparatus for search and tracking is disclosed. The apparatus comprises a targeting FLIR unit operating in an imaging mode. The apparatus also comprises means for detecting and tracking multiple targets.

BRIEF DESCRIPTION OF THE DRAWINGS

Various advantages of the present invention will become apparent to one skilled in the art upon reading the following specification and by reference to the following drawings in which:

FIG. 15 illustrates the performance of the clutter map threshold algorithm and the adaptive threshold algorithm used by the signal processor shown in FIG. 1;

DESCRIPTION OF THE PREFERRED EMBODIMENTS

Figure 1:
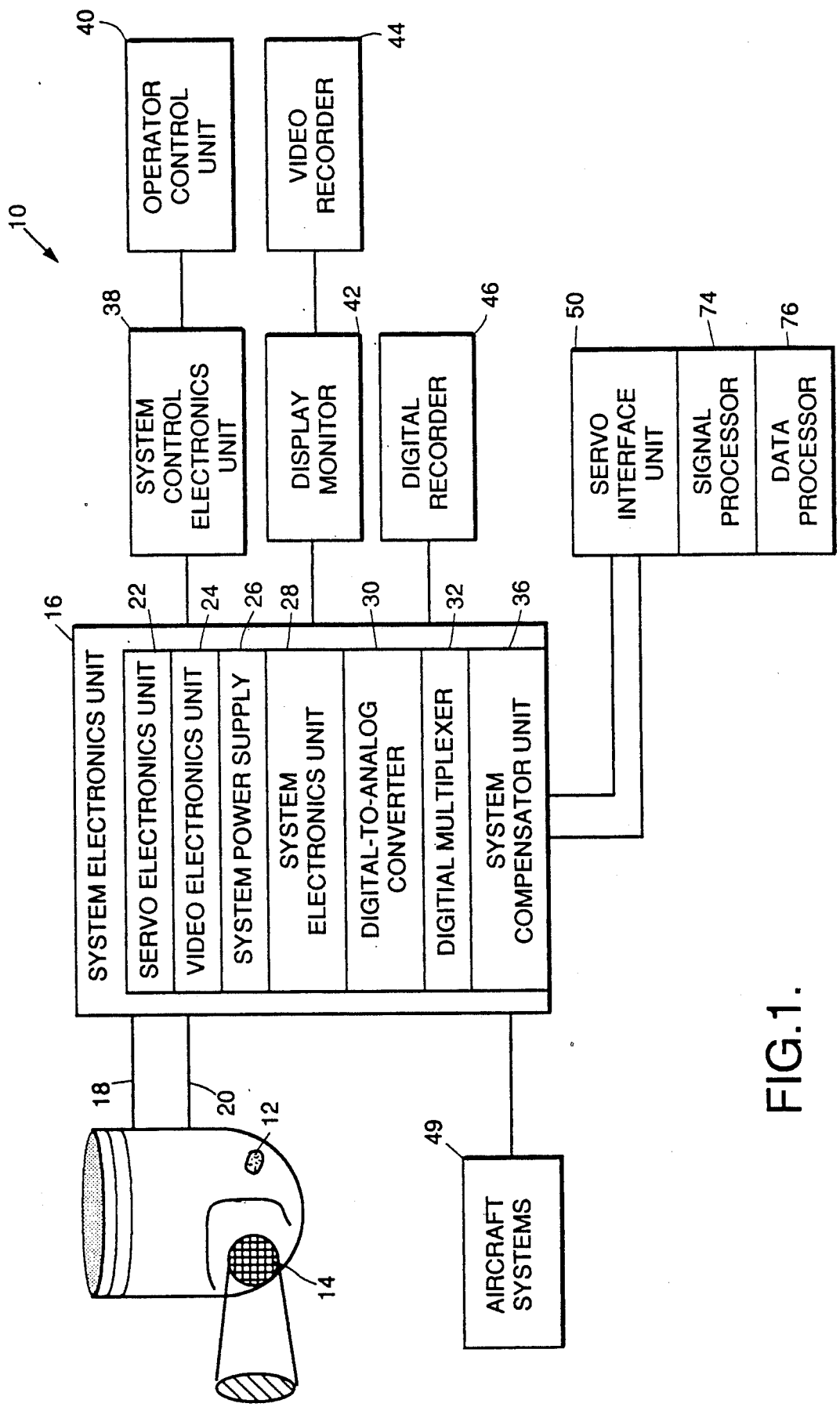
FIG. 1 is a block diagram of the apparatus for search and tracking according to the teachings of the preferred embodiment of the present invention.

As shown in FIG. 1, an apparatus 10 is provided for search and tracking a point source in an object space. The apparatus 10 includes a targeting FLIR unit 12 which may typically be mounted on an aircraft. The targeting FLIR unit 12 includes a FLIR 14 which mechanically communicates with a gimbal (not shown). The gimbal is used for orienting the FLIR during the search and tracking operations in the manner described below.

The targeting FLIR unit 12 electrically communicates with a system electronics unit 16. In this regard, the system electronics unit 16 delivers control signals to the gimbal of the targeting FLIR unit 12 through a control bus 18, while the system electronics unit 16 receives information from the targeting FLIR unit 12 regarding the object space through a video bus 20. The system electronics unit 16 performs the operations necessary for driving the targeting FLIR unit 12 as well as for processing the information from the targeting FLIR unit 12 so that the information may be visually displayed. For example, the system electronics unit 16 includes the servo electronics circuit 22 which is used for controlling the gimbal which is used in orienting the targeting FLIR unit 12. Further, the system electronics unit 16 includes the video electronics circuit 24 which is used for generating video signals which are delivered to a monitor and are recorded in the manner described below.

The system electronics unit 16 further comprises a system power supply 26. The system power supply 26 is used for providing the power necessary for driving the system electronics unit 16 as well as the targeting FLIR unit 12. The system electronics unit 16 further comprises the interface electronics unit 28. The interface electronics unit 28 is used for converting the signals received from and delivered to the infrared search and track electronics unit described below into signals which may be used by the system electronics unit 16. As those skilled in the art will realize, the design of the interface electronics unit 28 depends on the specific search and tracking system being used. However, it may be generally stated that the interface electronics unit 28 will have the components which are used to provide IRIG timing, provide current line of sight position from the resolvers and optical scanner, provide detector identification and signal output to the infrared search and track electronics unit, provide serial or parallel multiplexing of the detector signal outputs, and provide the interface command and control relay to and from the infrared search and track electronics unit for IRST search modes and switch to line of sight imaging track.

The system electronics unit 16 also includes an analog-to-digital converter 30 which is used for converting the analog output from the interface electronics unit 28 to a digital signal which may be used by the infrared search and track electronics unit described below. Further, the system electronics unit 16 includes a digital multiplexer 32 which is used for receiving command, control and inertial navigation system data from the aircraft systems 49.

The system electronics unit 16 further comprises a system compensation unit 36 which is used for performing a variety of functions which are application specific. For example, the system compensation unit 36 may provide calibration functions which are necessary to obtain accurate spatial positioning. These calibration functions may include:

Asynchronous times and scanner position

Asynchronous times and line-of-sight position

In field-of-view target locations relative to the line-of-sight

Line-of-sight spatial position relative to angular rate and angular position

Rate calibration of gimbal scan during start-stop segments and hysteresis

Further, the system compensation unit 36 may provide filters for eliminating the noise from the resolver pickoffs, as well as filters and formatting for error parameters of noisy inputs such as scanner position, IRIG times, and correlation of line-of-sight position with times. The system compensation unit 36 may also provide external gimbal scan rates and "usable" field-of-regard for control inputs. The system compensation unit 36 may also match track efficiency against gimbal search rates and bar patterns, as well as provide information regarding format and sampling rate of detector channel inputs. Further, the system compensation unit 36 may also provide information for corrections to track coordinate systems for sensor roll lags and non-horizontal imaging scan lines.

In addition, the system compensation unit 36 may be used for smoothing noisy platform angles, velocity altitude and rate information, as well as provide for field interlace timing and position correlation. Further, the system compensation unit 36 may also include an adaptable multiple hit algorithm (i.e., correlations versus external gimbal scan rate), as well as provide for a continuous track algorithm for minimizing spatial gaps in the detector array. The system compensation unit 36 may further provide a correlation spacing algorithm for asynchronous timed multiple hit with sufficient time between hits for regular track prediction. Finally, the system compensation unit 36 may also provide for real-time processing, as well as for search pattern control based on the tracks. Accordingly, the system compensation unit 36 is application specific and performs the functions which may be necessary to allow the algorithms described below to function with the application with which the apparatus 10 is to be used.

Further, the apparatus 10 also includes a system control electronics unit 38 as well as an operator control unit 40. The operator control unit 40 is used for directing the targeting FLIR unit 12 to a particular point source in the object space. The operator control unit 40 may either be a manual control or an autotracker. The system control electronics unit 38 is used for interfacing the operator control unit 40 with the system electronics unit 16. The apparatus 10 further includes a display monitor 42 which is used for visually displaying the output from the system electronics unit 16. A video recorder 44 is also provided which electrically communicates with the display monitor 42 for recording the visual display generated by the display monitor 42. In addition, the apparatus 10 further comprises a digital recorder 46 which is used for recording the output from the video electronics circuits 24 of the system electronics unit 16.

The components of the apparatus 10 described above may comprise an HNVS Block 01/System part number 3897000-110 night vision system manufactured by Hughes Aircraft Company. It will be appreciated, however, that other suitable night vision systems may be used.

As those skilled in the art will realize, the apparatus 10 with only the components described above cannot be generally used for continuous search and tracking for several reasons. For example, the gaps that are often present between the individual detector elements in the detector array of targeting common module FLIR unit 12 would tend to cause the targeting FLIR unit 12 to miss point targets. Further, when left in the imaging mode, the output from the targeting FLIR unit 12 would cause the system electronics unit 16 to register multiple target hits in a single field-of-view due to multiple overscans. In addition, the non-linear scan rate of the gimbal and the image scanner of the targeting FLIR unit 12 also tended to make spatial position accuracy difficult to achieve, particularly in view of the asynchronous timing associated with individual detector elements and the optical scanner. Further, the inputs to the system electronics unit 16 which were used to receive information such as positional and navigational data were relatively noisy, and such systems often had relatively low signal-to-noise ratios and poor resolution. Finally, systems which used common-module FLIRs did not use inertially stabilized coordinates nor could such systems achieve the performance requirements of single-function infrared search and tracking systems often required by the military. For these reasons, the apparatus 10 with only the components described above could operate only in a relatively slow step-stare mode or in a very slow search mode.

To overcome these disadvantages so that common-module targeting FLIR unit 12 may be used in search and tracking, the apparatus 10 further comprises means for detecting and tracking multiple targets. By using means for detecting multiple targets, the apparatus 10 is able to perform continuous infrared search and tracking operations using a common-module targeting FLIR unit.

Figure 2:
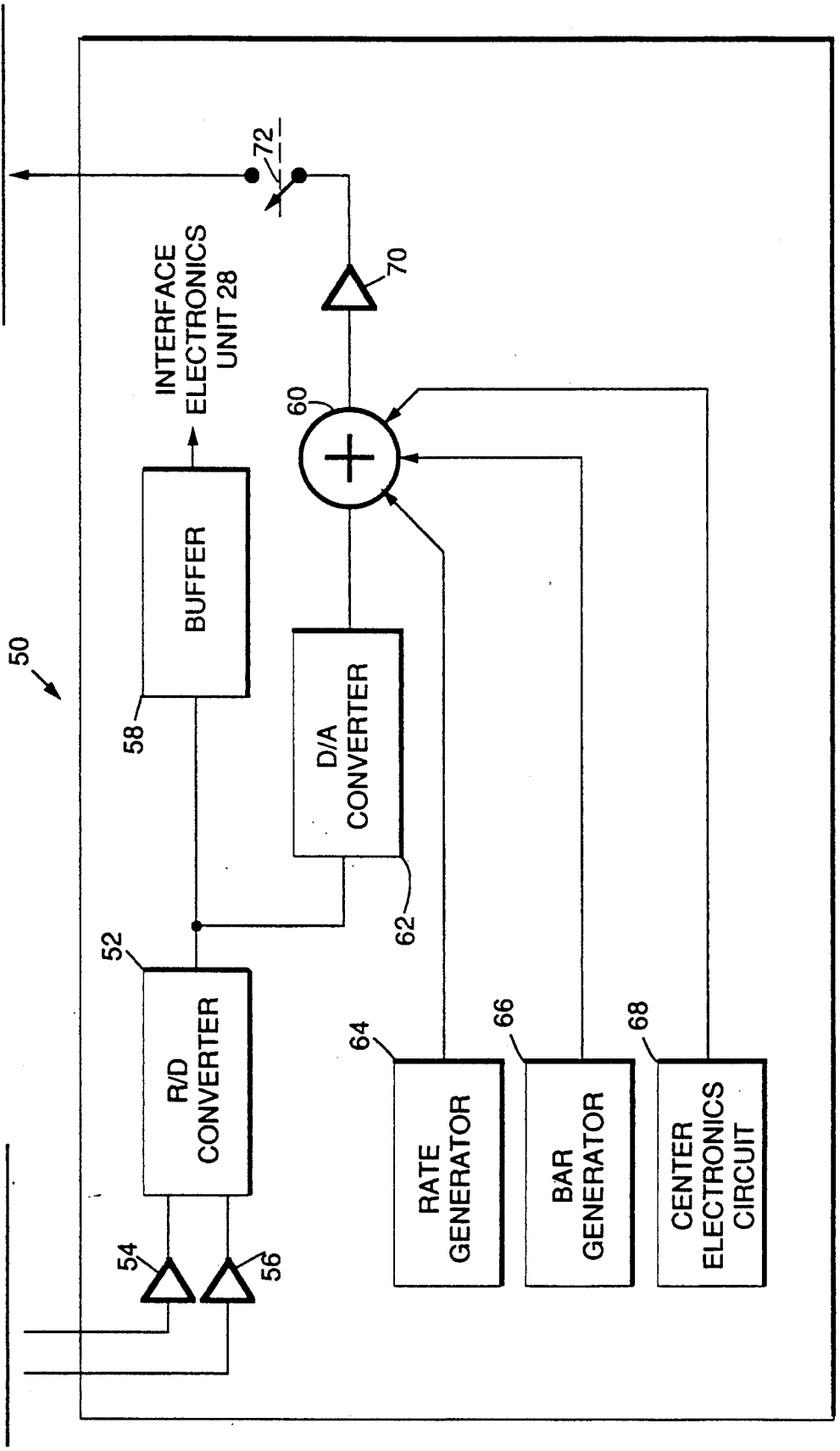
FIG. 2 is a block diagram of the servo interface unit shown in FIG. 1.

To provide means for detecting and tracking multiple targets, an infrared search and track electronics unit ("IEU") 48. The IEU 48 in turn comprises a servo interface unit 50 which is illustrated in FIG. 2. The servo interface unit 50 is used for receiving information regarding the current position of the gimbal as well as for providing information to the system electronics unit 16 regarding subsequent positioning of the gimbal. The servo interface unit 50 includes a resolver-to-digital converter 52 which receives the output from the resolver (not shown) of the targeting FLIR unit 12 through the systems electronics unit 16. The resolver of the targeting FLIR unit 12 is used to generate electrical signals in response to the positioning of the gimbal. The servo interface unit 50 also includes the amplifiers 54 and 56 which are used to amplify the signals from the systems electronics unit 16 prior to receipt by the resolver-to-digital converter 52.

The output from the resolver-to-digital converter 52 is delivered to the interface electronics unit 28 through a buffer 58, which is used to store the output of the resolver-to-digital converter 52 unit until the output is ready to be received by the systems electronics unit 16. Further, the output from the resolver-to-digital converter 52 is delivered to an adder 60 through a digital-to-analog converter 62. The adder 60 also receives inputs from a rate generator 64, a bar generator 66 and a center electronics circuit 68. The rate generator 64 is used to command and control the speed of movement of the gimbal. The bar generator 66 is used to establish the search pattern of the gimballed FLIR and the direction of search, and the center electronics circuit 68 is used to indicate the position center of the FLIR line of sight. The output from the adder 60 is delivered to the systems electronics unit 16 through an amplifier 70 as well as a switch 72. The switch 72 is used for controlling when the targeting FLIR unit 12 is to be operated in scan mode and when the targeting FLIR unit 12 is to be operated in search and tracking mode.

Figure 3:
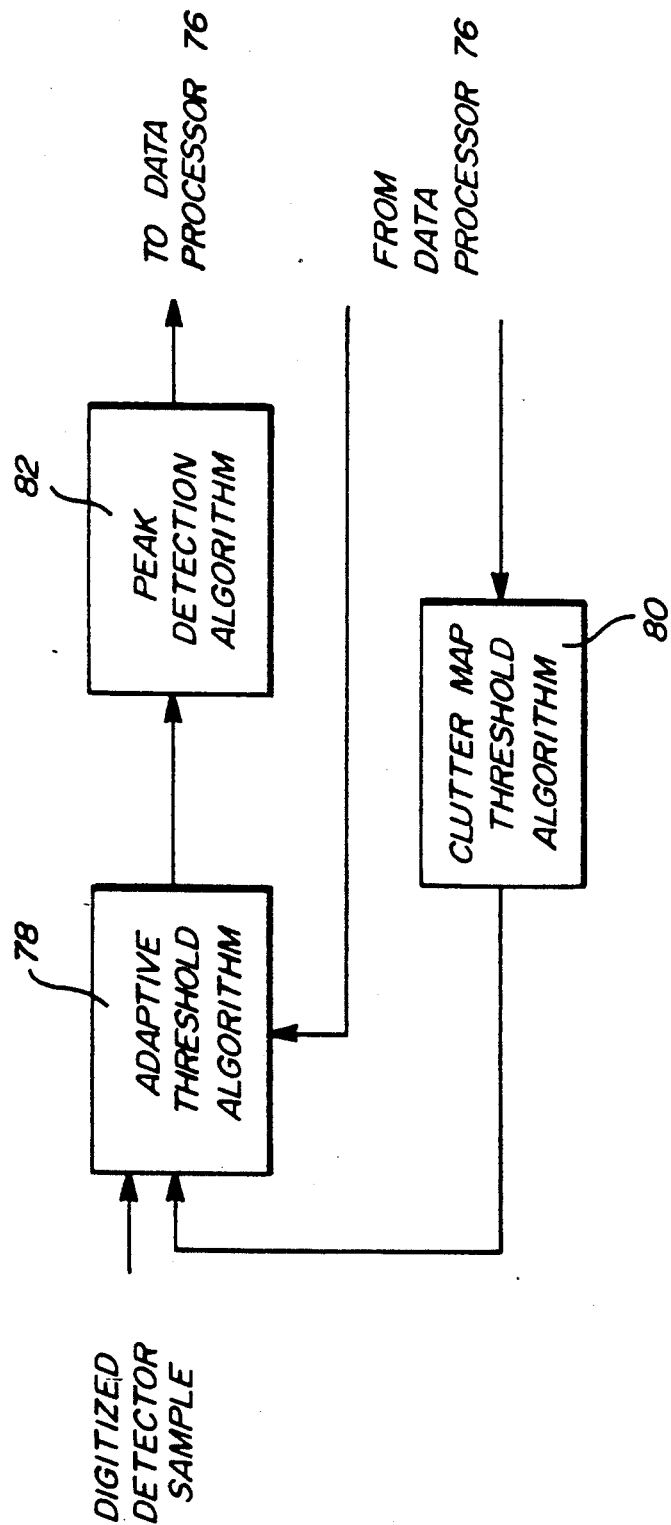
FIG. 3 is a block diagram illustrating the functional relationship of the algorithms used by the signal processor shown in FIG. 1.

The IEU 48 further comprises a signal processor 74 as well as a data processor 76. The signal processor 74 is used to perform the following algorithms as shown in FIG. 3: adaptive threshold algorithm 78, clutter map threshold algorithm 80, and the peak detection algorithm 82. As more thoroughly discussed below, the adaptive threshold algorithm 78 is used for generating an adaptive threshold which causes broad source clutter to be rejected. Except during initialization, the adaptive threshold algorithm 78 does not require interactive control from the data processor 76. The clutter map threshold algorithm 80 reduces background clutter induced false alarms by thresholding input samples on a FLIR field-of-view sector basis under threshold control of the data processor 76. In this regard, the clutter map threshold algorithm 80 limits the number of observations which are delivered to the data processor 76 so that the data processor does not become overloaded. The peak detection algorithm 82 which is also performed by the signal processor 74 corrects the output of the signal processor 74 for multiple samples from the same target due to target images extending over multiple samples. Each of these algorithms will be more fully discussed below.

The data processor 76 is used to perform the following algorithms: threshold control, track acquisition algorithm, track association, track filter algorithm, observation acceptance function, vidicon ghost logic algorithm, FLIR overscan logic algorithm, track classification algorithm, as well as various input/output processor functions. The operational organization of the algorithms performed by the data processor 76 will be described with reference to FIG. 4. The algorithms which are performed by the data processor 76 at FLIR field or frame rate (typically 30 or 60 Hz respectively) are located within the box identified with the numeral 84, while the algorithms performed at the track-while-scan rate (typically 1 Hz) by the data processor 76 are shown in the box identified by the numeral 86. Information which is received by the data processor 76 from the signal processor 74 is first processed by the observation acceptance function 88. The observation acceptance function 88 accepts observations from the signal processor 74 and assigns the observation memory pointers to each observation to allow more efficient layer processing. In addition, the observation acceptance function 88 permits conversion of scan field and scan line information to actual elevation based on the gimbal resolver outputs and vidicon synchronization signals. The information generated by the observation acceptance function 88 is stored in the field or frame memory 90 which stores the data from each field until all fields are scanned. The information which is stored in the memory 90 is then used by the vidicon ghost logic algorithm 92. As more fully described below, the vidicon ghost logic algorithm 92 is used for eliminating the ghost which may appear when using a vidicon targeting FLIR unit due to the interlace scanning. The output from the vidicon ghost logic algorithm 92 is delivered to the FLIR overscan logic algorithm 94 which is used to delete observations which are the product of overscan.

The output from the FLIR overscan logic algorithm 94 is delivered to the track-while-scan observation buffer 96 of the data processor 76. The information stored in the track-while-scan observation buffer 96 is used to perform reiterative loops on each track as indicated by the box identified by the numeral 98. These loops include the application of the track association algorithm 100 which is used to assign new scan observations to established tracks prior to filtering. The loops included in the box 98 also involve the track filter algorithm 102 which is used to smooth and predict tracks. In addition, the loops included in the box 98 include a track classification algorithm 104 which is used for characterizing tracks as either target tracks or clutter tracks. The information which is generated by the track classification algorithm 104 is stored in the track file 106 which contains information regarding target tracks, tentative tracks and clutter tracks. The information generated during the application of the track classification algorithm 104 is used by the track acquisition algorithm 108 to form tentative tracks by associating two consecutive scan observations.

After performing the loops identified by the box 98, the data processor 76 executes the threshold control algorithm 110 which is used for modifying the threshold generated by the clutter map threshold algorithm 80 to reflect current data processing resources. After executing step 110, the data processor 76 performs the necessary input/output processor functions 112 to provide information to the display monitor 42 as well as the digital recorder 46.

Figure 5:
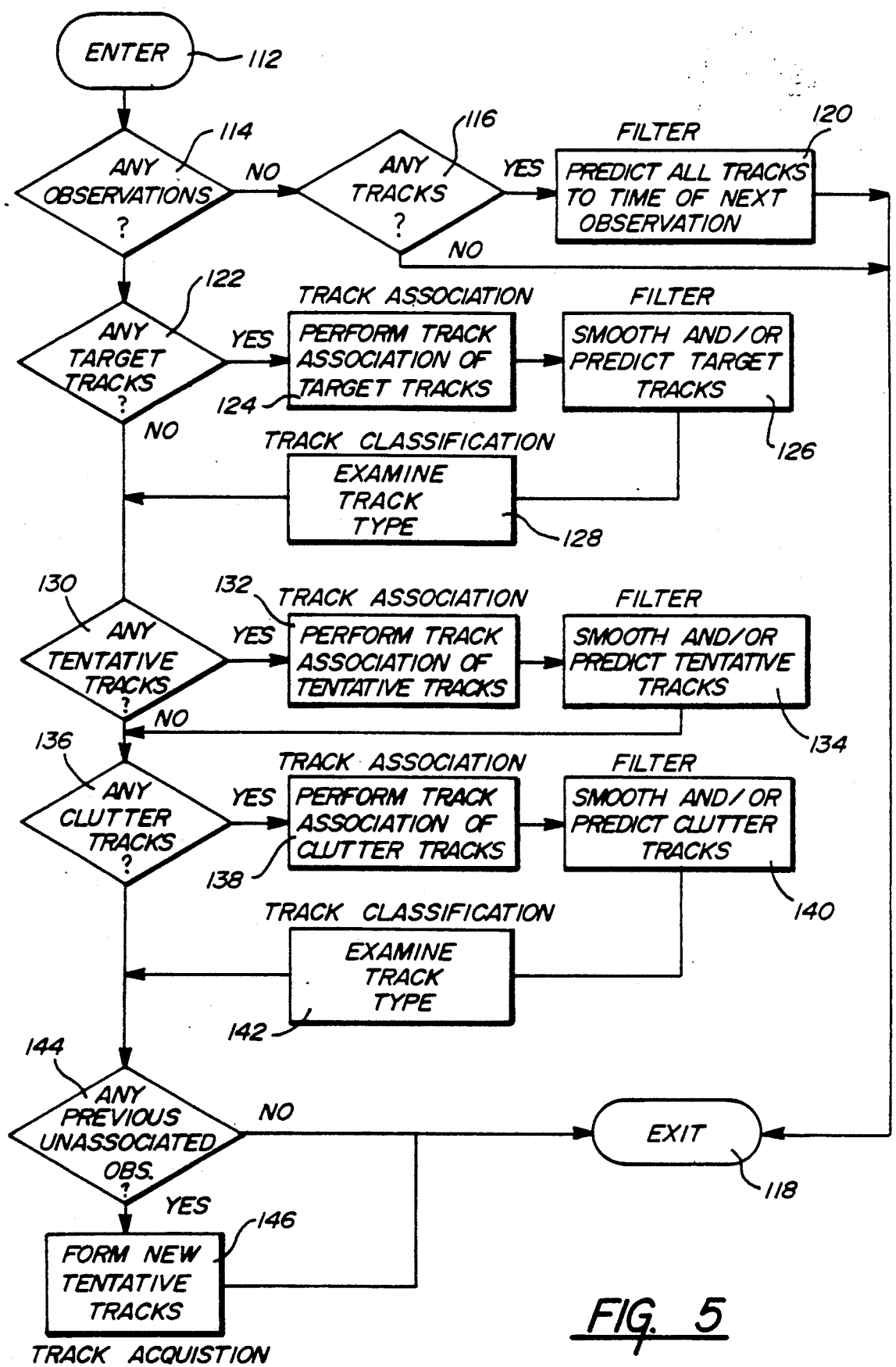
FIG. 5 illustrates the relationship between the track association, track filtering, and track acquisition algorithms in FIG. 4.

The organization of the algorithms which are executed in the box 98 by means of the step 112 will now be described with reference to FIG. 5. After entry into the box 98, the data processor 76 executes step 114 in which the data processor 76 determines whether there have been any observations received by the data processor 76. If there have been no observations, the data processor 76 executes step 116 in which the data processor 76 determines whether any tracks have been identified by the data processor 76. If there have been no tracks identified by the data processor 76, the data processor 76 terminates execution of the tracking algorithms via the step 118. If tracks have been identified by the data processor 76, the data processor 76 executes the track filter algorithm 102 at step 120 which is used to smooth and/or predict tracks. After executing step 120, the data processor 76 terminates execution of the tracking algorithms via the step 118.

If the data processor 76 determines at step 114 that there have been observations, the data processor 76 then executes step 122. At step 122, the data processor 76 determines if there are existing target tracks. If there are existing target tracks, the data processor 76 executes step 124 in which the track association algorithm 100 is performed. After executing step 124, the data processor 76 executes step 126 in which the track filter algorithm 102 is performed. The track classification algorithm 104 is then executed at step 128 which determines the threat level of the track and whether or not the track is clutter. After executing step 128, or if at step 122 the data processor 76 determines that there are no existing target tracks, the data processor 76 executes steps 130.

At step 130, the data processor 76 determines whether there are any tentative tracks. If the data processor 76 determines that there are tentative tracks, the data processor 76 executes the track association algorithm 100 at step 132 and then executes the track filter algorithm 100 at step 134. After the track filter algorithm 100 has been performed at step 134, or if the data processor 76 at step 130 has determined that there are no tentative tracks, the data processor 76 executes step 136.

At step 136, the data processor 76 determines whether there are clutter tracks. If there are clutter tracks, the data processor 76 executes the track association algorithm 100 with respect to the clutter tracks at step 138 as well as the target filtering algorithm 100 at step 140. The track classification algorithm 104 is then executed at step 142 which determines the threat level of the track and whether the track is clutter. After the track classification algorithm 104 has been performed at step 140, or if at step 136 the data processor 76 determines that there are no existing clutter tracks, the data processor 76 executes step 144.

At step 144, the data processor 76 determines whether there have been any prior observations which have not been associated with either a target track, a tentative track, or a clutter track. If there have been no unassociated observations, the data processor 76 terminates execution of the tracking algorithms at step 118. If there have been prior observations which have not been associated with either a target track, a tentative track, or a clutter track, the data processor 76 executes step 146 which attempts to form a new tentative track via the track acquisition algorithm 103. After executing step 146, the data processor 76 terminates execution of the tracking algorithms via the step 118.

The interrelationship of the algorithms performed by the signal processor 74 and the data processor 76 have been described above. In the following, each of the algorithms will be more fully described in detail.

1. SIGNAL PROCESSOR ALGORITHMS

1.1 Adaptive Threshold Algorithm

To provide means for generating an adaptive threshold, an adaptive threshold algorithm 78 is provided. The adaptive threshold algorithm 78 is used by the signal processor 74 to reject broad source clutter so as to reduce the possibility that the apparatus 10 will identify natural backgrounds as targets. As more fully discussed below, the adaptive threshold algorithm 78 removes low frequency Wiener type 1/f noise which is usually associated with natural backgrounds. In contrast, the adaptive threshold algorithm 78 allows higher frequency input signals which are typically associated with targets to pass.

Figure 6:
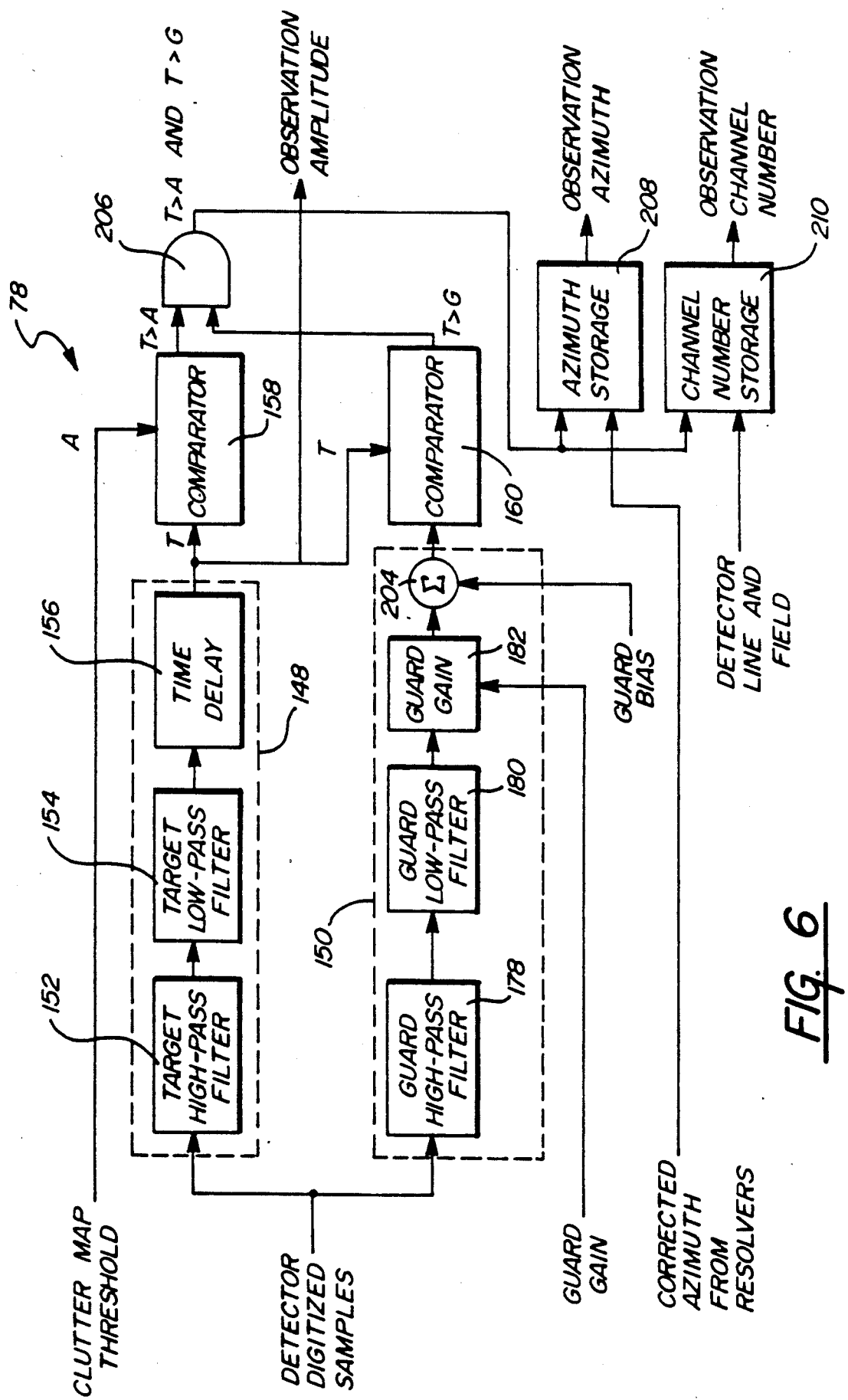
FIG. 6 is a block diagram of the adaptive threshold algorithm executed by the signal processor shown in FIG. 1.

A simplified block diagram of the adaptive threshold algorithm 78 is shown in FIG. 6. The adaptive threshold algorithm 78 digitizes samples from each detector as it scans the background and possibly one or more targets from the system compensation unit 36. The detector samples represents information regarding the potential target signal and will be more specifically described below. The detector digitized samples are delivered to a target filter 148 and a guard filter 150 which form part of the adaptive threshold algorithm 78. The target filter 148 comprises a target high-pass filter 152, a target low-pass filter 154, as well as a time delay element 156. The target high-pass filter 152 is used to remove the bulk of the low frequency noise associated with most natural backgrounds, while the target low-pass filter 154 is used to remove high frequency signals generally associated with noise so as to optimize target detection signal-to-noise ratio. The output of the target low-pass filter 154 is delivered to the time delay element 156. The time delay element 156 is used for delaying the output of the target low-pass filter 154 prior to delivery to the comparator 158 and the comparator 160 so as to compensate for the faster rise time of the target filter 148 as compared to the guard filter 150.

Figure 7:
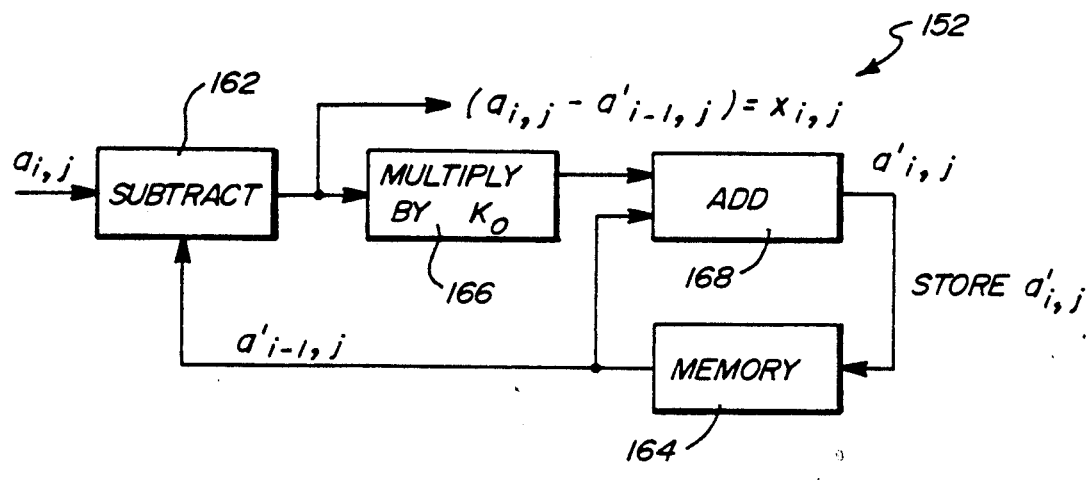
FIG. 7 illustrates the operation of the target high-pass filter shown in FIG. 6.

The operation of the target high-pass filter 152 of the target filter 148 will now be described with reference to FIG. 7. The variables which will be used to describe the operation of the target high-pass filter 152 represent the following:

$K_o$ = filter gain for high-pass target filter
$a_{i,j}$ = digital amplitude of detector line j at time (sample) i
$a'_{i-1,j}$ = contents of filter memory for last sample
j = detector line number
i = current sample number
where the processing that takes place can be represented by:

$$a'_{i,j} = a'_{i1,j} + K_o(a_{i,j} - a'_{i-1,j})$$

$$a'_{i-1,j} \leftarrow a'_{i,j} \text{ (i.e., reset memory)}$$

and results in an output of:

$$(a_{i,j} - a'_{i-1,j}) = X_{i,j}$$

To implement this processing, the target high-pass filter 152 comprises a subtractor 162 which subtracts the value of $a_{i,j}$ from the value of $a'_{i-1,j}$ which is stored in the memory 164. The output $X_{i,j}$ from the subtractor 162 is delivered to the target low-pass filter 154 as well as to the multiplier 166 where the output from the subtractor 162 is multiplied by $K_o$ which is empirically determined. The output from the multiplier 166 is delivered to an adder 168 which adds the output from the multiplier 166 with the output from the memory 164. The output $a'_{i,j}$ from the adder 168 is then delivered to the memory 164 for storage.

Figure 8:
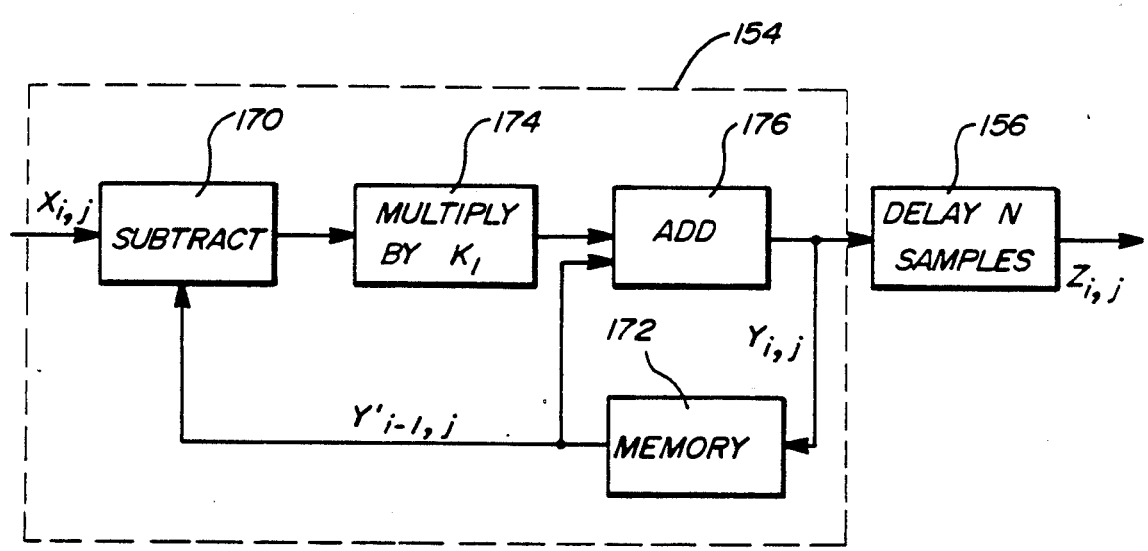
FIG. 8 illustrates the operation of the target low-pass filter shown in FIG. 6.

The output $X_{i,j}$ from the target high-pass filter 152 is delivered to the target low-pass filter 154, the operation of which will now be described with reference to FIG. 8. The variables which are shown in conjunction with the target low-pass filter 154 represent the following:

$K_1$ = filter gain of the low-pass filter 154
$A_j$ = threshold for detector line j from the data processor 76
$X_{i,j} = (a_{i,j} - a'_{i-1,j})$ = output from the target high-pass filter 152
$y'_{i-1,j}$ = contents of filter memory
N = number of samples which are to be delayed (typically 3).

The processing which is performed by the target low-pass filter 154 may be represented algebraically as indicated below:

(a) $y_{i,j} = y'_{i-1,j} + K_1(x_{i,j} - y'_{i-1,j})$ $y'_{i-1,j} \leftarrow y_{i,j}$ (i.e., reset memory)

(b) save $y_{i,j}, y_{i-1,j}, \ldots, y_{i-N,j}$ (c) set $Z_{i,j} = y_{i-N,j}$ If $y_{i-N,j} \geq A_j$ set $Z_{i,j} = 0$ If $y_{i-N,j} < A_j$ To perform this processing, the target low-pass filter 154 comprises a subtractor 170 which subtracts $X_{i,j}$ from $y'_{i-1,j}$ which is stored in a memory 172. The output from the subtractor 170 is then multiplied by $K_1$ by a multiplier 174, the value of which is empirically determined. The output from the multiplier 174 as well as contents of the memory 172 are then added by the adder 176. The output from the adder 176 is then delivered to the memory 172 as well as the delay element 156 which delays the output from the adder 176 by N samples.

As discussed above, the digitized detector samples from the system compensation unit 36 are also delivered to a guard filter 150. The guard filter 150 is designed to produce a signal output envelop of larger amplitude than that of the target filter 148 for temporally extended outputs. As more fully described below, the output from the target filter 148 is compared to the output of the guard filter 150, as well as to a clutter map threshold setting generated by the data processor 76. If the output of the target filter 148 exceeds both the output from the guard filter 150, as well as the clutter map threshold setting, a threshold exceedance signal is generated by the adaptive threshold algorithm 78.

The guard filter 150 comprises a guard high-pass filter 178 and a guard low-pass filter 180, each of which will be more fully described below. In addition, the guard filter 126 also comprises a guard gain element 182 which amplifies the output of the guard low-pass filter 180 in response to a guard gain signal from the data processor 76. This allows the guard filter level to be optimized to existing clutter during initialization.

Figure 9:
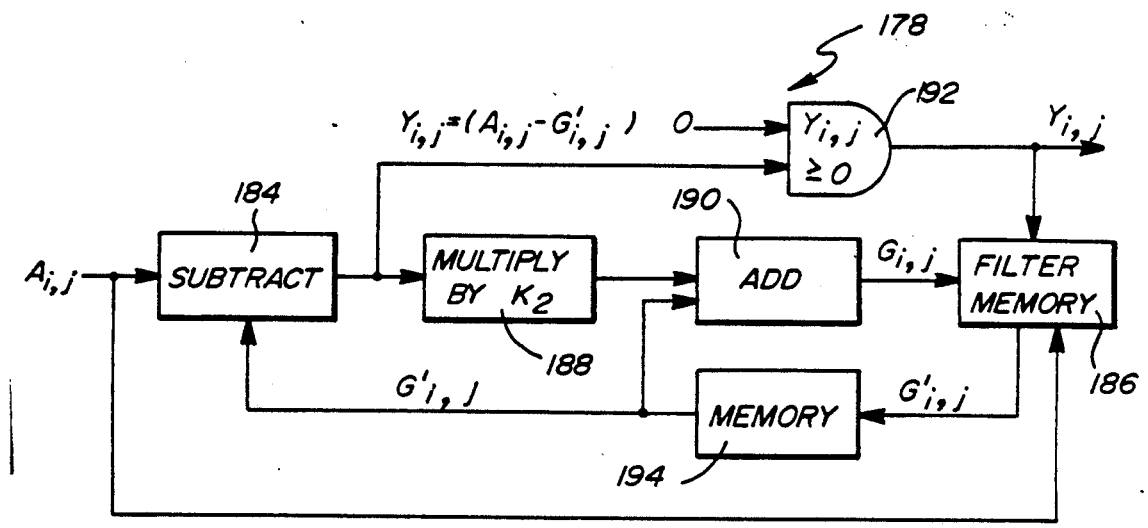
FIG. 9 illustrates the operation of the guard high-pass filter shown in FIG. 6.

The operation of the guard high-pass filter 178 will now be described with reference to FIG. 9 and with use to the following variables:

$K_2$ = filter gain for the guard high-pass filter 156
$a_{i,j}$ = digital amplitude from detector line j at time (sample) i
$G'_{i,j}$ = contents of guard low-pass memory
j = detector line number
i = current sample number As shown in FIG. 9, the digital amplitude $a_{i,j}$ of detector line j at sample time i is delivered to a subtractor 184 as well as to a filter memory 186. The subtractor 184 then subtracts from $a_{i,j}$ the value of $G'_{i,j}$ which is stored in the memory 194. The result from this subtraction is then multiplied by the filter gain $K_2$ by the multiplier 188 and is delivered to the adder 190. In addition, the result from the subtraction is delivered to an AND gate 192, the output of which is equal to $y_{i,j}$ or zero depending on whether $y_{i,j}$ is greater or less than zero respectively. The adder 190 adds the output from the multiplier 188 with the contents of the memory 194. The output from the adder 190 is then delivered to the filter memory 186. The output from the filter memory 186 is then delivered to the memory 194.

Accordingly, the processing performed by the guard high-pass filter 178 can be represented by the following:

(a) $G_{i,j} = G'_{i,j} + K_2(a_{i,j} - G'_{i,j}) = G'_{i,j} + K_2 y_{i,j}$ (b) Set $y_{i,j} = 0$ if $y_{i,j} < 0$ (c) Set $G'_{i,j} = y_{i,j}$ if $y_{i,j} > 0$

Set $G'_{i,j} = A_{i,j}$ if $y_{i,j} = 0$

Figure 10:
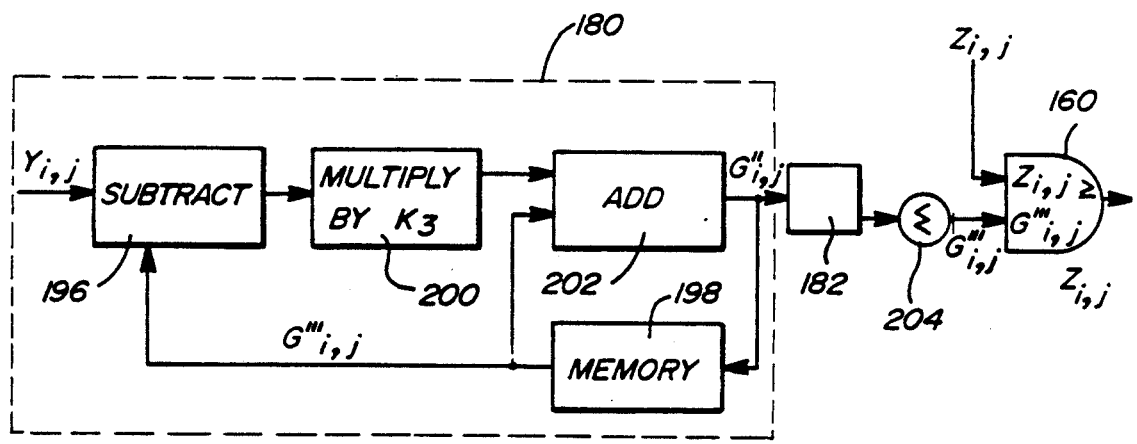
FIG. 10 illustrates the operation of the guard low-pass filter shown in FIG. 6.

The output $y_{i,j}$ of the guard high-pass filter 178 is delivered to the guard low-pass filter 180, the operation of which will now be described with reference to FIG. 10. The variables which will be used in describing the operation of the guard low-pass filter 180 have the following representations:

$y_{i,j}$ = output of the guard high-pass filter 156 for sample i of detector line j
$Z_{i,j}$ = output of delayed target sample i of detector line j
$K_3$ = gain of guard low-pass filter (empirically determined)
$K_4$ = gain of the guard filter
$G''_{i,j}$ = contents of the guard low-pass filter memory
B = bias of the guard filter As shown in FIG. 10, the output $y_{i,j}$ from the guard high-pass filter 178 is subtracted by the subtractor 196 from the value of $G'''_{i,j}$ which is stored in a memory 198. After the subtraction operation, the output of the subtractor 196 is multiplied by the low-pass filter gain $K_3$ by a multiplier 200. The output from the multiplier 200 is then added by an adder 200 to $G'''_{i,j}$ which is stored in the memory 198. After the addition, the guard gain element 182 multiplies the output of the adder 200 by $K_4$, which is empirically determined, and then a bias factor B (typically zero) is added to the output of the guard gain element 182 by means of the summation circuit 204 to shape the signal. The output from the summation circuit 204 is then delivered to the comparator 160 which generates an output equal to $Z_{i,j}$ if the value of $Z_{i,j}$ is greater or equal to the value of $G'''_{i,j}$. If the value of $Z_{i,j}$ is less than the value of $G'''_{i,j}$, then no output is generated by the comparator 160. Accordingly, the processing performed by the guard low-pass filter 180 can be represented as follows:

(a) $G''_{i,j} = G''_{i-1,j} + K_3(y_{i,j} - G''_{i-1,j})$ (b) $G''_{i,j} \rightarrow G''_{i-1,j}$ (i.e., reset memory)

(c) $G'''_{i,j} = K_4 G''_{i,j} + B$ (d) If $Z_{i,j} \geq G'''_{i,j}$, then generate observation $Z_{i,j}$.

As described above, the adaptive threshold algorithm 78 further includes the comparators 159 and 160 which electrically communicate with an AND gate 206 shown in FIG. 6. The comparator 158 receives the output from the delay element 156, as well as the output from a clutter map threshold setting from the clutter map thresholding algorithm 180. Further, the output from the delay element 156 is delivered to the comparator 160, which also receives the output from a summation circuit 204. As discussed above, the summation circuit 204 receives the output from the guard gain element 182 as well as a guard bias signal from the data processor 76. If the amplitude of the output from the time delay element 156 exceeds both the clutter map threshold setting delivered to the comparator 158 as well as the output from the summation circuit 204 delivered to the comparator 160, a threshold exceedance signal is generated by the AND gate 106. The threshold exceedance signal is then delivered to an azimuth storage memory 208 as well as channel number storage memory 210. When the threshold exceedance signal is received by the azimuth storage memory 208 as well as the channel number storage memory 210, the azimuth storage memory 208 stores the azimuth of the current observation while the channel number storage memory 210 stores the detector line and field of the current observation. Accordingly, the azimuth and channel number of the most recent observation which generated a threshold exceedance signal is stored in the azimuth storage memory 208 as well as the channel number storage memory 210 respectively.

Figure 11:
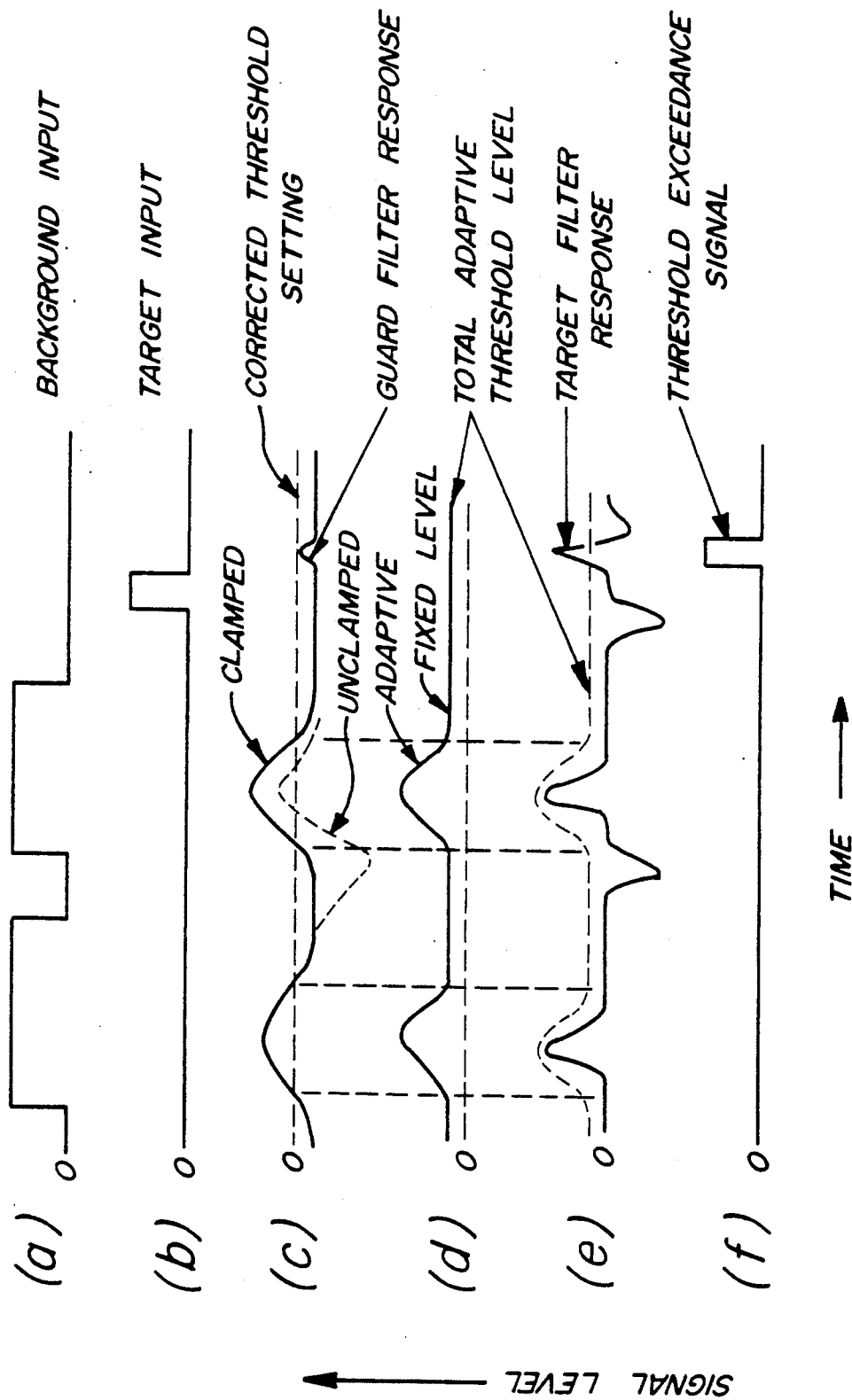
FIG. 11 illustrates the operation of the adaptive threshold algorithm shown in FIG. 6.

The operation of the adaptive threshold algorithm 78 is illustrated with reference to FIG. 11. In FIG. 11(a), a background input is shown which typically has dominantly low-frequency content. In FIG. 11(b), the target input is shown which has a relatively small low-frequency content. The response of the guard filter 150 is shown in FIG. 11(c), which also shows the clutter map threshold setting. The amplitude of the response of the guard filter 150 is greater for the background input due to the fact that the background input is dominantly of low-frequency content. The total adaptive threshold level is shown in FIG. 11(d), which illustrates the adaptive portion of the threshold level, together with the fixed threshold level.

The output from the target filter 148 is shown in FIG. 11(e) in response to the target input shown in FIG. 11(b), together with the adaptive threshold level superimposed. As shown, when the background input is high, the total adaptive threshold level is also high so as to prevent the adaptive threshold algorithm 78 from generating a threshold exceedance signal. However, when the target input is high, the output from the target filter 148 is greater than the total adaptive threshold level. Accordingly, the adaptive threshold algorithm 78 generates a threshold exceedance signal as shown in FIG. 11(f).

1.2 Clutter Map Threshold Algorithm

To provide means for limiting the number of observations processed by the data processor 76, the clutter map threshold algorithm 80 is provided. The clutter map threshold algorithm 80 controls the threshold in areas of high background observation density or clutter. As more thorougly discussed below, the clutter map threshold algorithm examines each field-of-view region of the field-of-regard for excessive noise threshold crossings in an initialization mode. The thresholds are then recursively modified during operation in response to the average observation amplitude and number of threshold exceedances. When a particular region of the field-of-view has a significant change in the number of threshold exceedances, the threshold in these regions are changed slowly one significant threshold increment (one least significant bit) per scan of the region. In those regions of the field-of-view where there has not been significant changes in the number of threshold exceedances, the threshold is maintained at a nominal (approximately four least significant bits) value.

Figure 12:
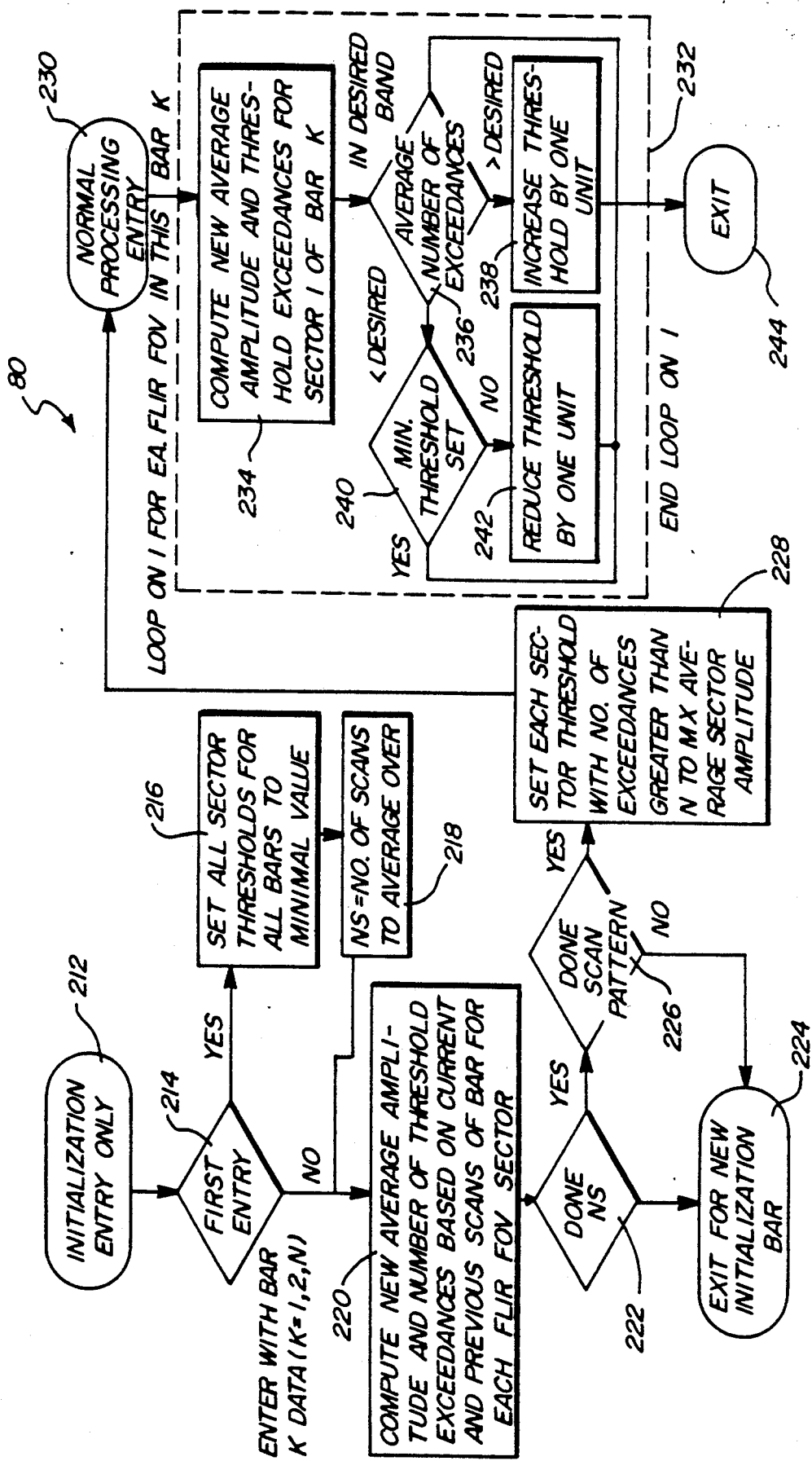
FIG. 12 is a block diagram illustrating the clutter map threshold algorithm used by the signal processor shown in FIG. 1.

The clutter map threshold algorithm will now be more fully described with reference to FIG. 12. Processing begins at step 212 when the clutter map threshold algorithm 80 is in the initialization mode. At step 212, data for each bar or scan line of the field-of-view, each being divided into a finite number of sectors each usually equivalent to the FLIR field-of-view, is received from the signal processor 74. The clutter map threshold algorithm 80 determines at step 214 whether the data being received by the clutter map threshold algorithm 80 is the first data entry representing the first bar of the FLIR field-of-view. If the data being received is the first data entry, clutter map threshold algorithm 80 executes step 216 in which the thresholds for all sectors of each bar are set to a minimal value (four least significant bits). After executing step 216, the clutter map threshold algorithm 80 executes step 218 in which the value of the variable NS is set equal to the number of scans which are to be averaged to determine the average observation amplitude. After execution of step 218 or if at step 214 the clutter map threshold algorithm 80 determines that the scan line or bar under consideration is not the first bar or entry, the clutter map threshold algorithm 80 executes step 220. At step 220, the clutter map threshold algorithm 80 computes a new average amplitude and number of threshold exceedances based on the current and previous scans of bar for each FLIR field-of-view sector. The clutter map threshold algorithm 80 determines whether the number of scans which have been used in determining the average observation amplitude is less than equal to the variable NS (i.e., the desired number of scans). If the number of scans which have been used in determining the average observation amplitude is equal to the value of NS, then the clutter map threshold algorithm 80 executes step 224 in which a data from a new bar is obtained from the signal processor 74 prior to executing step 212.

If at step 222 the clutter map threshold algorithm 80 determines that the number of scans used to determine the average observation amplitude is equal to the variable NS, then the clutter map threshold algorithm 80 executes step 226. At step 226, the clutter map threshold algorithm 80 determines whether the entire scan pattern has been initialized. If the entire scan pattern has not been initialized, the clutter map threshold algorithm 80 executes step 224. If the entire scan pattern has been initialized, the clutter map threshold algorithm 80 executes step 228. At step 228, the clutter map threshold algorithm 80 identifies those sectors of each bar in which the number of threshold exceedances are greater than the value of N, which is the maximum number of observations which the processor can handle. The clutter map threshold algorithm 80 sets the thresholds for each sector whose number of threshold exceedances is greater than N equal to M multiplied by the average amplitude of the sector. The value of M is usually equal to one, but is selected to be a variable for initialization control.

After executing step 224 or when the clutter map threshold algorithm 80 is being executed during normal processing (i.e., after initialization), the clutter map threshold algorithm 80 executes step 230 which represents the entry point for a loop 232 which recursively executes steps 234–242 for each sector for the bar under consideration. At step 234, the most recent data for the sector under consideration is used to calculate the new average observation amplitude of that sector as well as the number of threshold exceedances. After executing step 234, the clutter map threshold algorithm 80 executes step 236. At step 236, the clutter map threshold algorithm 80 determines whether the average number of threshold exceedances is greater than the desired band of threshold exceedances, less than the desired band of threshold exceedances or within the desired band of threshold exceedances. The desired band of threshold exceedances is chosen to maintain the optimum number of observations which are processed. If the clutter map threshold algorithm 80 determines that the average number of threshold exceedances is above the desired band of threshold exceedances, the clutter map threshold algorithm 80 executes step 238 which increases the threshold by one least significant bit. The loop 232 then causes the data from the next sector of the bar to be evaluated by executing the step 244.

If the average number of threshold exceedances is lower than the desired band, the clutter map threshold algorithm 80 executes step 240 which determines whether the user has established a minimum threshold level. If the user has not set a minimum threshold level, then the clutter map threshold algorithm 80 executes step 242 which reduces the threshold by one least significant bit. After executing step 242 or if the minimum threshold level has been set at step 240, the loop 232 causes the data from the next sector of the bar to be evaluated by executing step 244. After all sectors in the bar have been evaluated by the loop 232, clutter map threshold algorithm 80 exits the loop 232 via the step 244.

Figure 13:
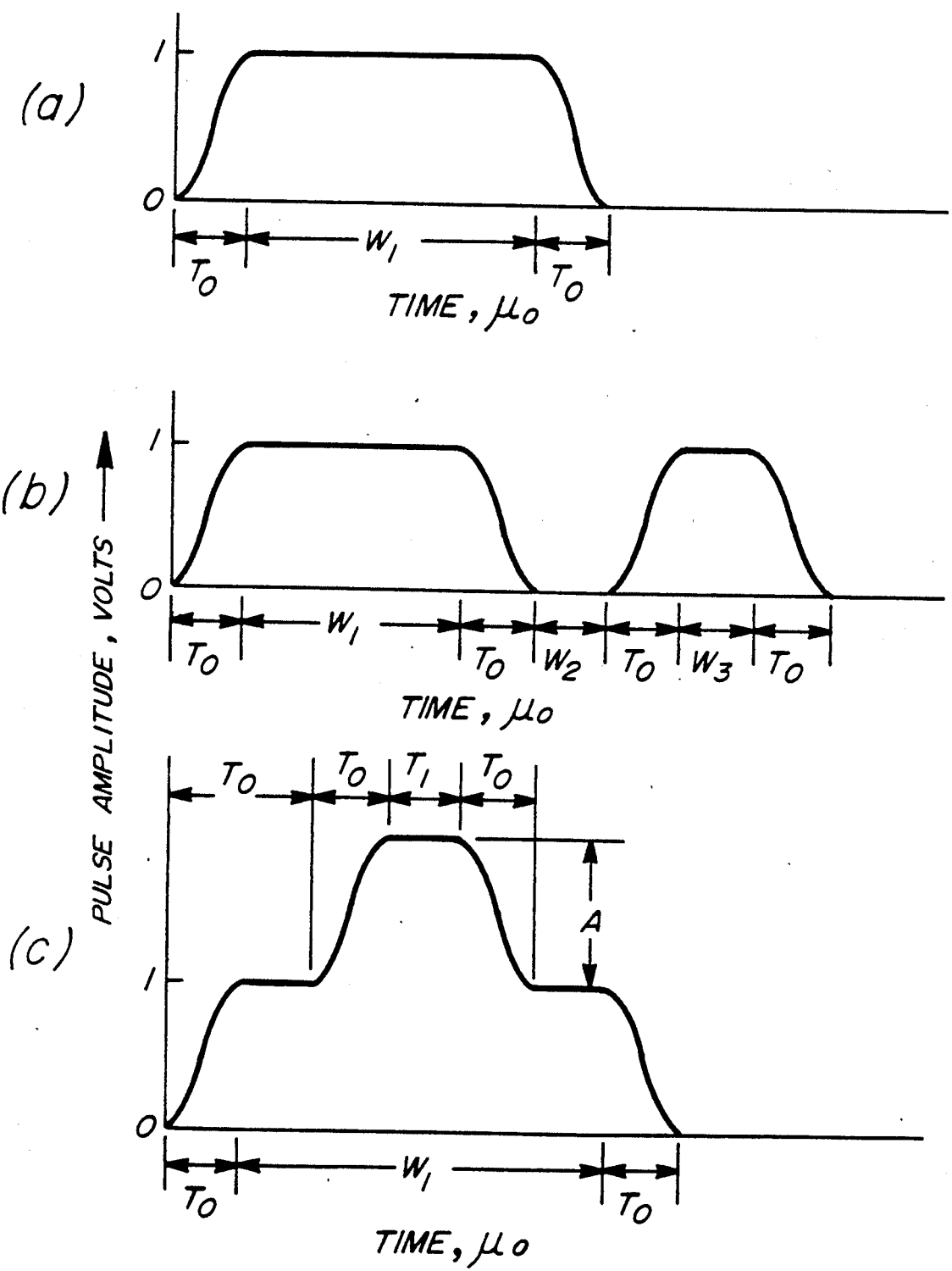
FIG. 13 illustrates the operation of the clutter map threshold algorithm as well as the adaptive threshold algorithm used by the signal processor shown in FIG. 1.

To aid in the understanding of the clutter map threshold algorithm 80 as well as the adaptive threshold algorithm 78, the following example will be presented with reference to FIG. 13. An idealized model of the output voltage of a preamplifier receiving the output from a detector element as the detector element is being scanned across an infrared point source is given as:

$$v_{preamp} = \sin^2(\pi t / 2 T_D)$$

where:
$v_{preamp}$ = output voltage of the preamplifier
t = time
$T_D$ = dwell time of the detector The pulse shape of the output voltage of the preamplifier when the detector scans an extended infrared source, using the rise and fall of the signal pulse to determine the pulse width at which extended sources are rejected, is shown in FIG. 13(a). A double pulse, used to simulate either a blue sky patch (hole) in a cloud or a target following a cloud, is shown in FIG. 13(b). A compound pulse used to determine the target-plus-background-to-background irradiance ratio $((1+A)/1)$ necessary to detect a target against a background is shown in FIG. 13(c).

Figure 14:
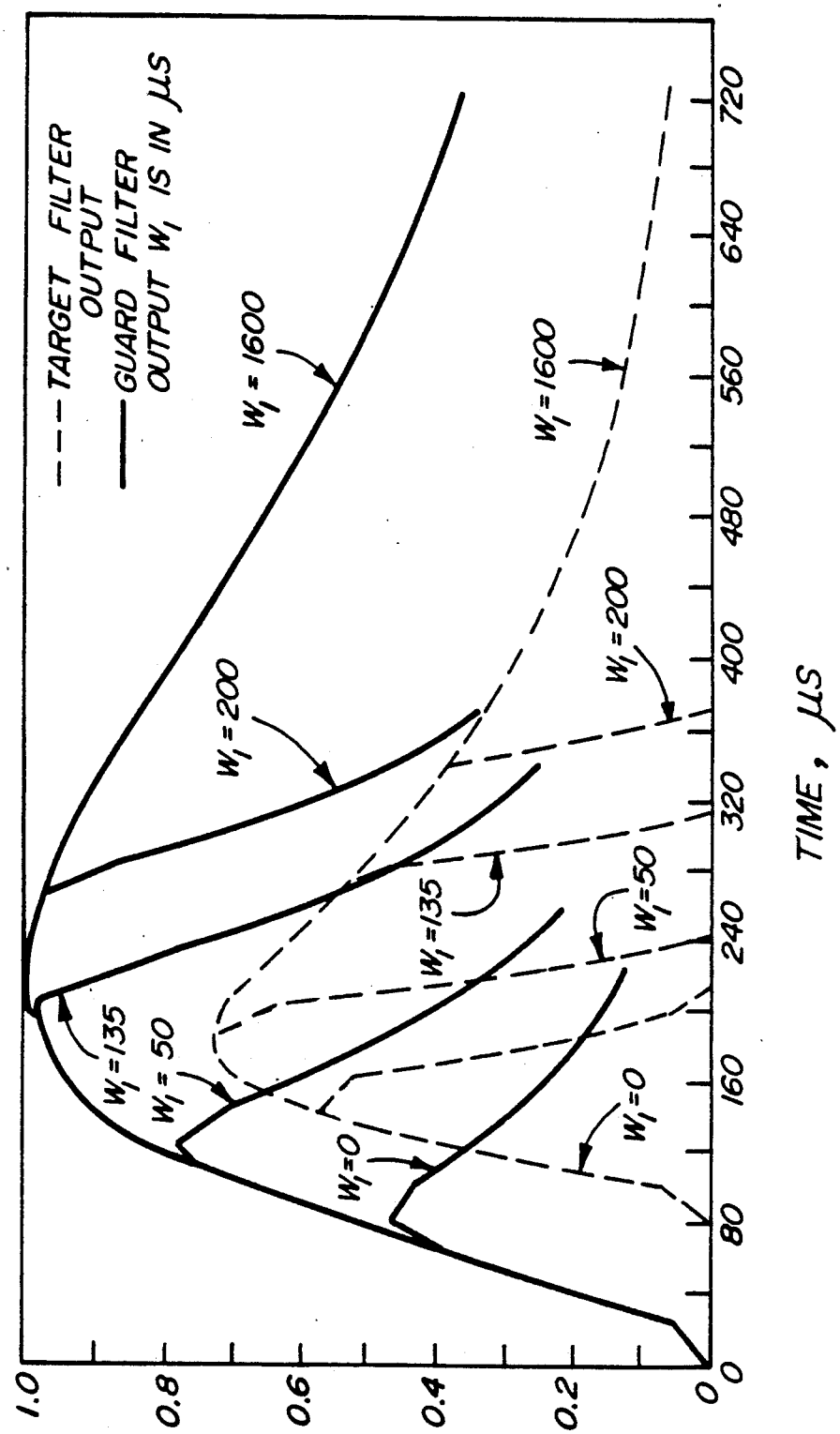
FIG. 14 illustrates the response of the target filter and the guard filter shown in FIG. 6 in response to the input shown in FIG. 13(a)

The response from the target filter 148 and the guard filter 150 when the output from the preamplifier follows that which is shown in FIG. 13(a) is illustrated in FIG. 14. The pulse flat-top width $w_1$, at which extended targets are rejected, is approximately 135 μs (0.85 mrad) so that the output target filter (dashed lines) exceeds the output of the guard filter (solid lines) for point source inputs ($w_1=0$) and somewhat extended inputs ($w_1=50$). Accordingly, the input shown in FIG. 13(a) will generate a threshold exceedance signal. Good background discrimination is achieved by rejecting spatial objects that extend greater than about 1 mrad and better pulse width background discrimination is achieved by a smaller $w_1$ width. Typical values of $w_1$ at crossover (i.e., when the output of the target filter 148 and the guard filter 150 are equal) are given in FIG. 15 as a function of target delay and guard filter gain.

Figure 16:
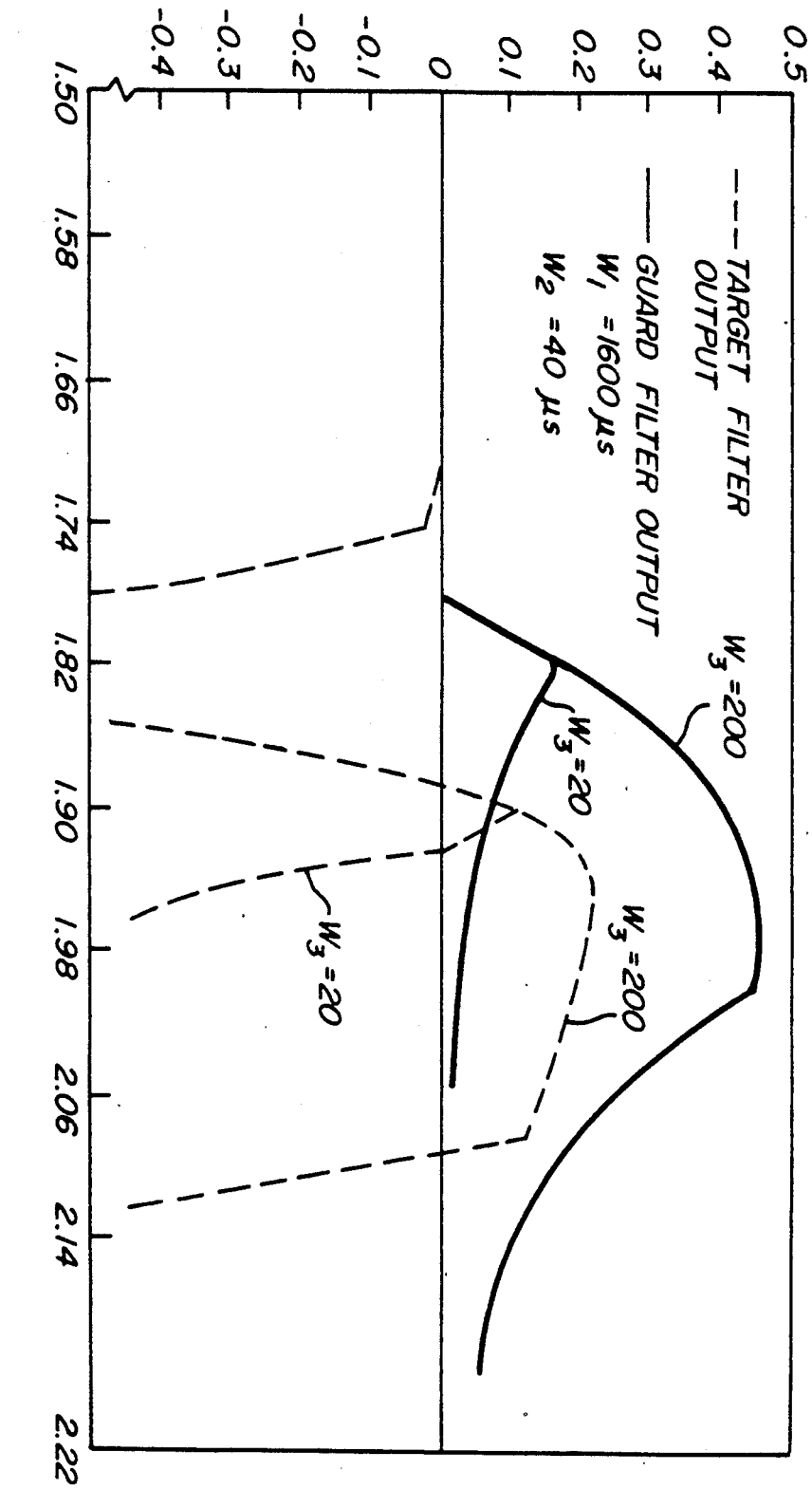
FIG. 16 illustrates the response of the guard filter and the target filter shown in FIG. 6 in response to the input shown in FIG. 13(b)

The response of the target filter 148 and the guard filter 150 when the output of the preamplifier is a double pulse as shown in FIG. 13(b) is shown in FIG. 16. The responses shown in FIG. 13(b) represent a long cloud section ($w_1$) followed by a blue sky patch ($w_2$) followed by a short ($w_3$) cloud section. As shown in FIG. 16, the output of the guard filter 150 always exceeds the output of the target filter 148 so that no false alarms are generated. If the width $w_3$ is only one tenth as long, the width represents a target and it can be seen that a threshold exceedance is generated. The clamping action of the guard filter 150 is such that no size of cloud hole will produce false alarms for any of the guard gain and delay combinations previously listed.

Figure 17:
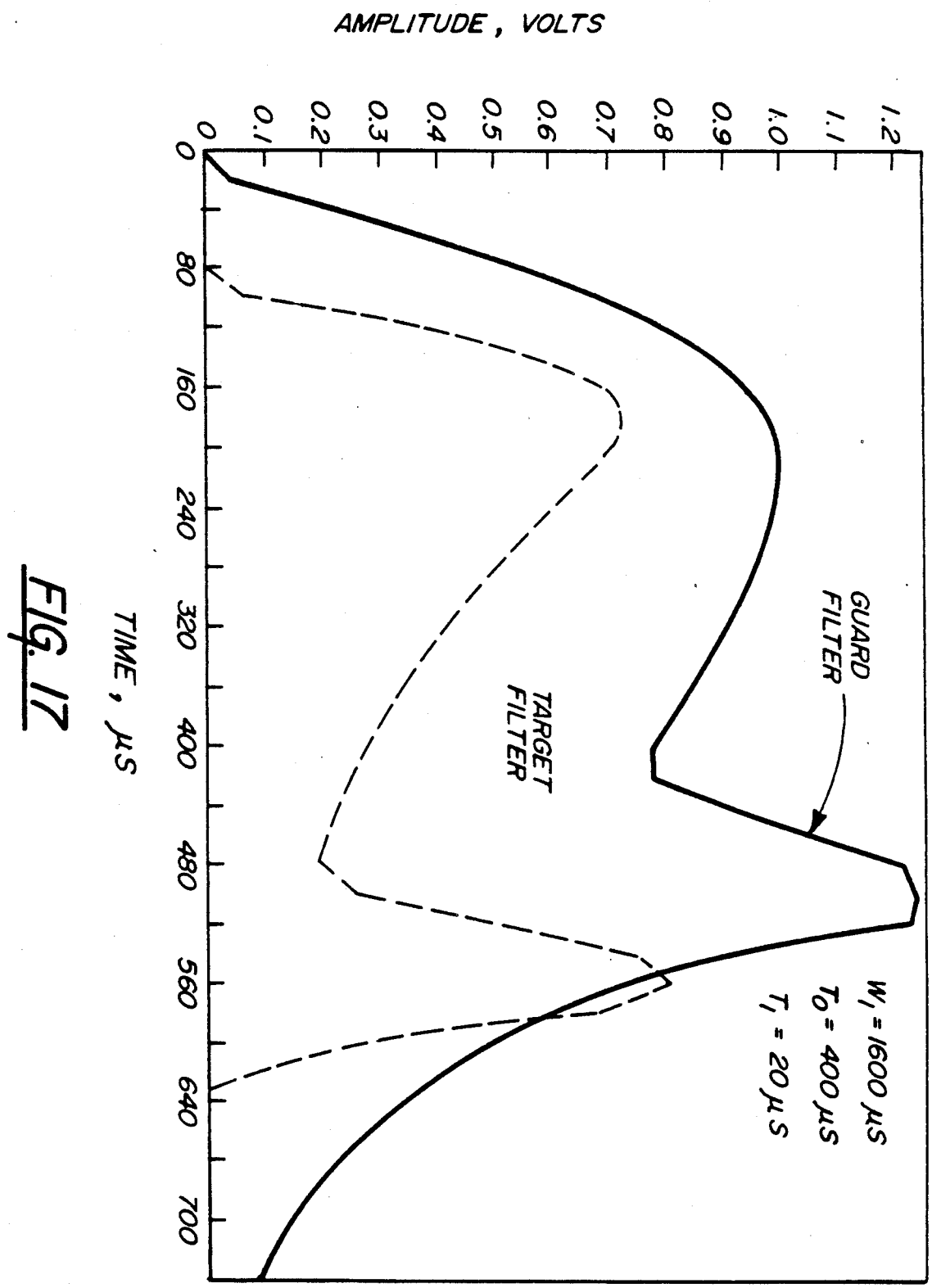
FIG. 17 illustrates the response of the target filter and the guard filter shown in FIG. 6 with respect to the input shown in FIG. 13(c)
Figure 18:
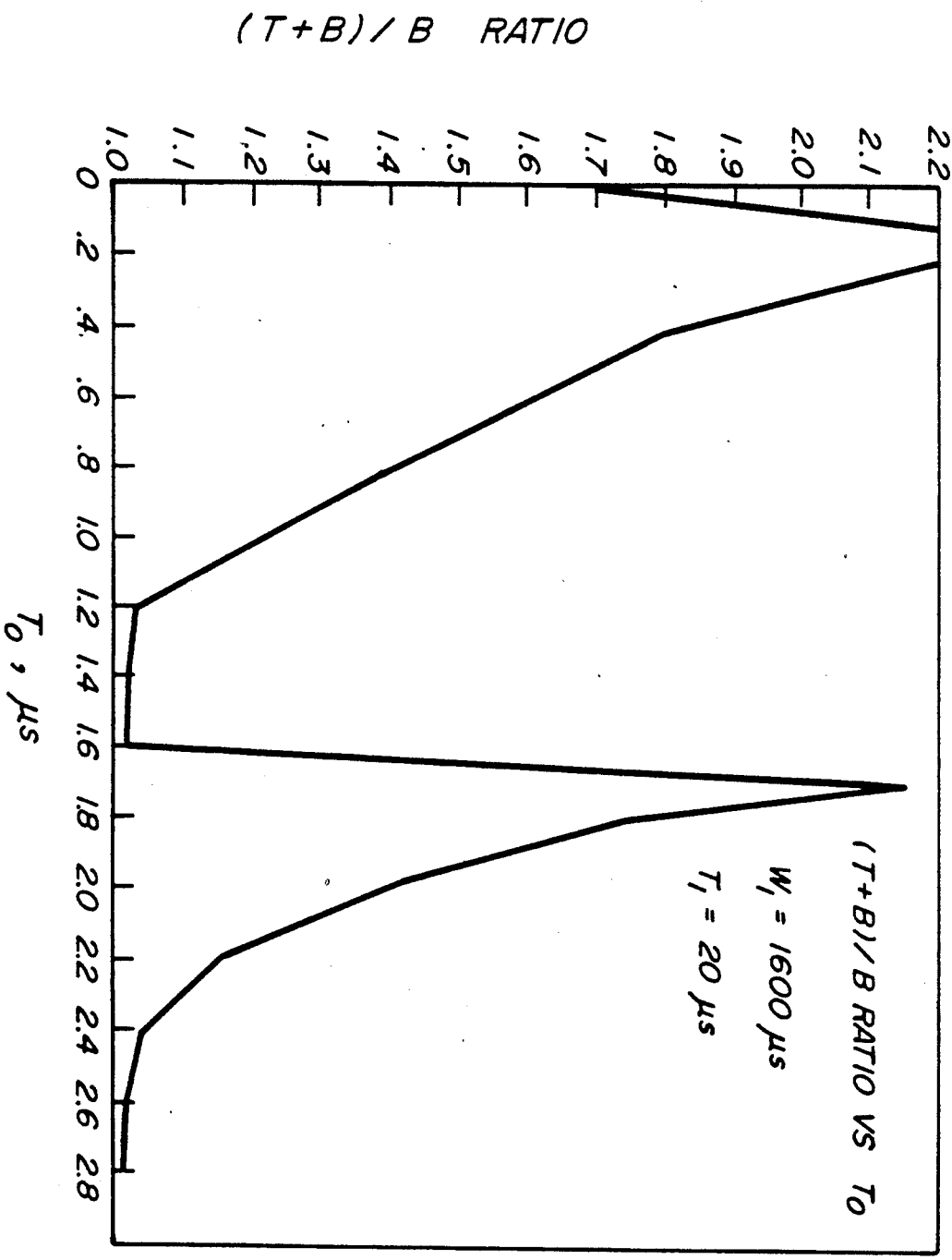
FIG. 18 illustrates the normalized detection ratio of the apparatus for search and tracking shown in FIG. 1 under specified conditions.

The compound pulse shown in FIG. 13(c) is used to demonstrate the capability of target detection embedded in a background. A particular response for $w_1=1600$ μs, $T_o=400$ μs and $T_1=20$ μs is shown in FIG. 17. When the output of the target filter 148 exceeds the output of the guard filter 150, a threshold exceedance signal is generated. If $T_o$ is varied from 0 to greater than 2000 μs, the amplitude required for detection of a typical size target ($T_o=20$ μs or 0.125 mrad) can be determined and a normalized detection ratio $(T+B)/B$ established where T is target amplitude and B is background amplitude. This ratio is plotted as a function of time in FIG. 18. The ratio is rarely greater than 2.2 at either the leading or trailing edges and rapidly returns to unity (full sensitivity) in only 1200 μs (7.5 mrad).

Figure 19:
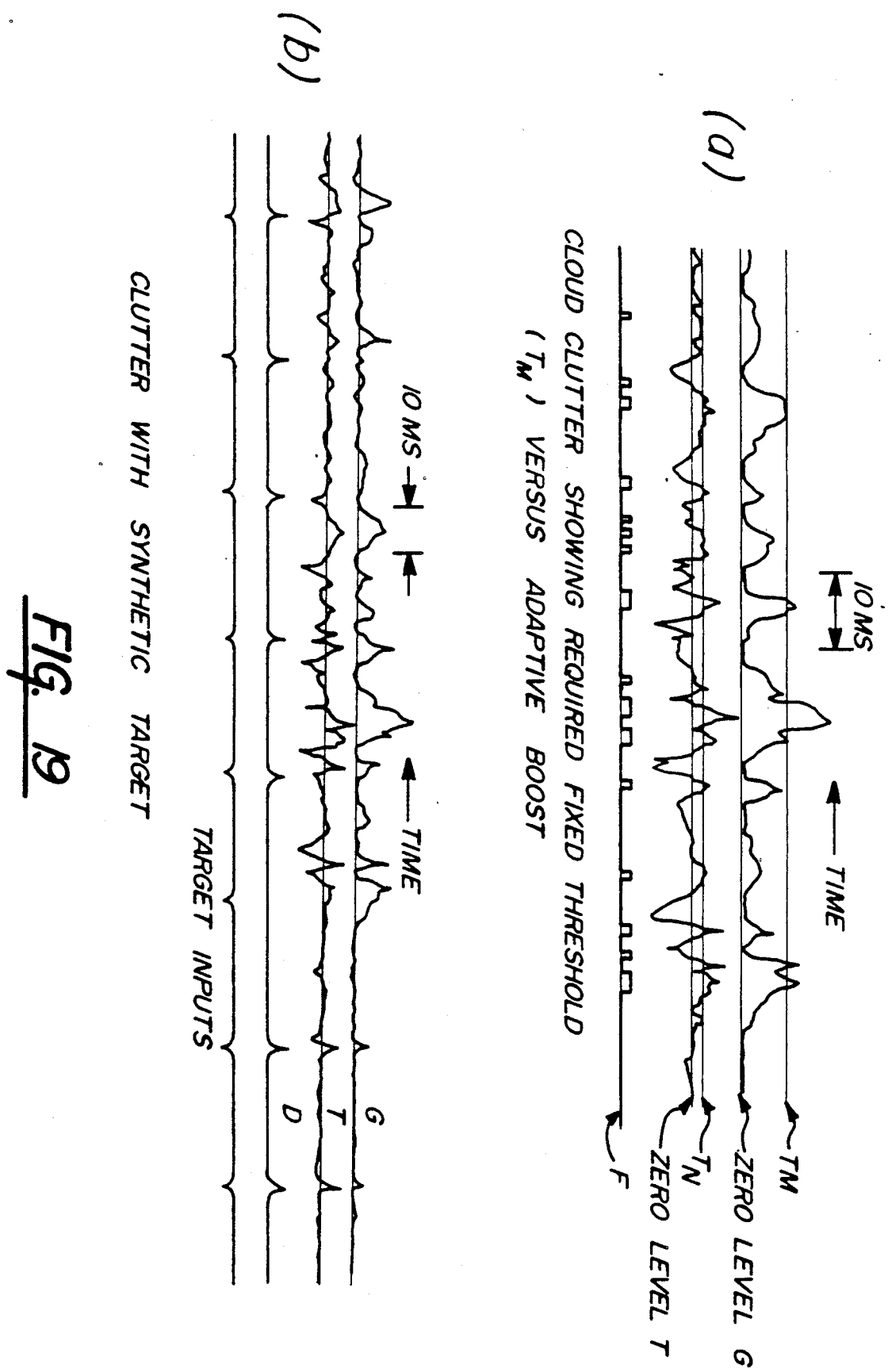
FIG. 19 represents an example of the adaptive threshold algorithm shown in FIG. 6 under actual background conditions.

An example of adaptive threshold algorithm using real background conditions is shown in FIG. 19(a). In this example, T represents the output of the target filter 148, G represents the output of the guard filter 150, $T_M$ is a normal threshold setting used to establish a low false alarm rate for "blue sky" conditions, and $T_N$ represents the fixed clutter map threshold level. The inputs to the target filter 148 and the guard filter 150 are taken from real "bright broken cloud" data tape recorded from the output of an experimental 80 deg/sec scan rate system. An analog adaptive threshold system of the type shown in FIG. 19 was time scaled to fit the scan rate and used to produce the outputs shown. Simulated target signals were added to the output shown in FIG. 17(a) to obtain FIG. 19(b). Even over a limited viewing angle as shown in FIG. 19(a), a great number of false alarms are produced because of the background if adaptive thresholding is not employed and the threshold setting is $T_N$. The $T_N$ level required to remove these false alarms without adaptive thresholding is considerably higher than $T_M$ and impairs the target detection capability.

The output of the guard filter 150 rarely exceeds $T_M$, thus demonstrating an improved target detection capability. This capability is shown in FIG. 19(b) where targets with only twice the amplitude required to produce a threshold exceedance are injected. The target signals are clearly visible on the T output in the blue sky region on the right side of FIG. 19(b), whereas they are virtually indistinguishable in the background. The utility of the adaptive threshold technique is shown in the threshold exceedance outputs (D output in FIG. 19(b)) where all but one of the target inputs are detected without the occurrence of false alarm outputs.

1.3 Peak Detection Algorithm

To provide means for compensating for multiple exceedances of the adaptive threshold from the same target, the peak detection algorithm 82 is provided. The peak detection algorithm 82 performed by the signal processor 74 is used to compensate for multiple threshold exceedances from the same target due to target images extending over multiple samples. The peak detection algorithm 82 saves the peak "maximum amplitude" output from the clutter map threshold algorithm 80 once an observation exceeds the adaptive threshold as well as a clutter map threshold. Each subsequent consecutive observation which also exceeds the adaptive threshold and the clutter map threshold is also examined by the peak detection algorithm 82. When a subsequent consecutive observation falls below either the adaptive threshold or the clutter map threshold, the peak detection algorithm 82 delivers the observation having the greatest amplitude from the previous consecutive sequence of observations to the data processor 76.

2. DATA PROCESSOR ALGORITHM

2.1 Vidicon Ghost Logic Algorithm

Figure 20:
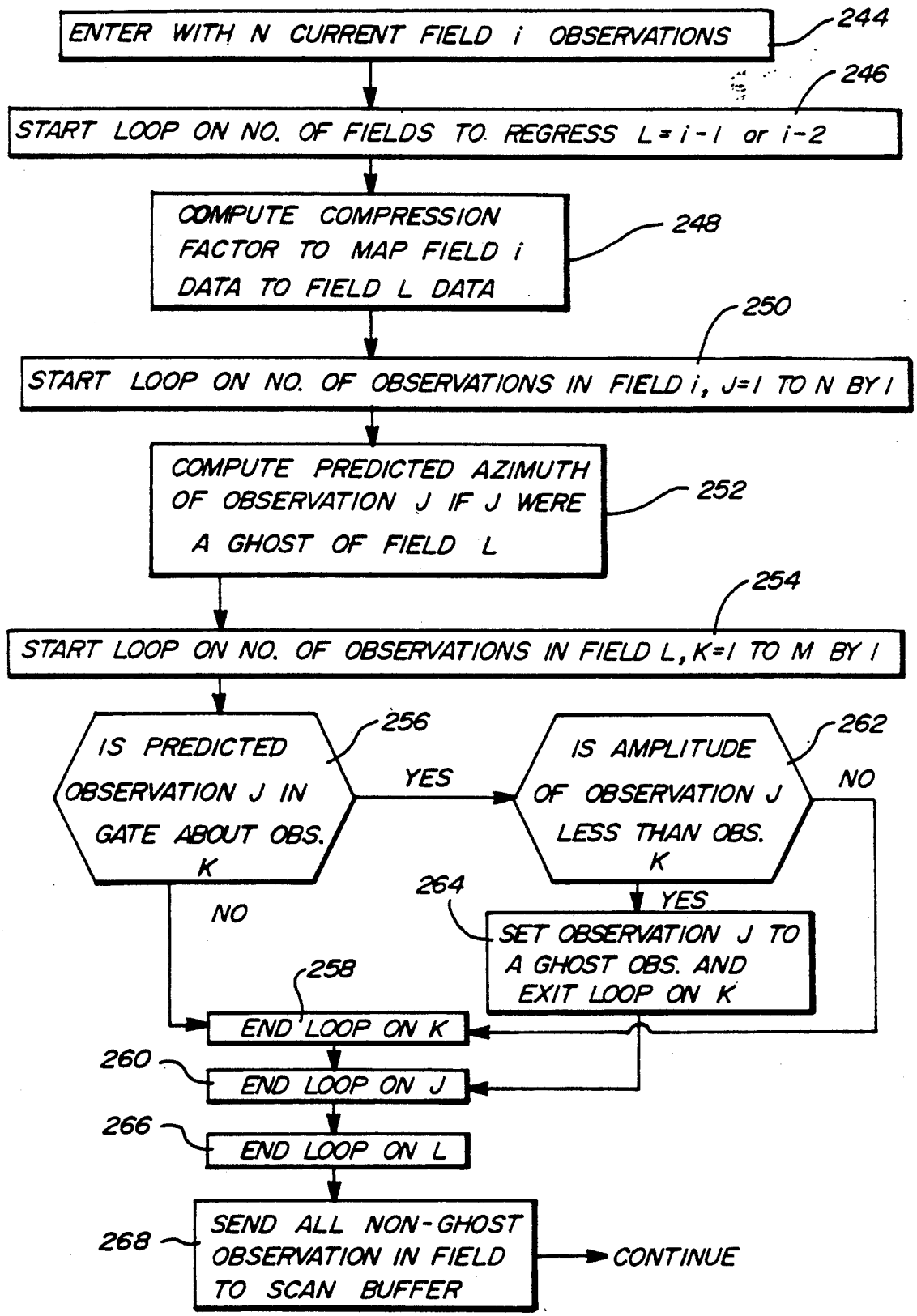
FIG. 20 illustrates the vidicon ghost logic algorithm used by the data processor as shown in FIG. 4.

Often when applying the present invention using vidicon targeting FLIR units, a "ghost" or false target may appear on the vidicon due to phosphorescence. This ghost is caused by the displacement of interlaced scan field under the gimbal scan procedure which is used by the targeting FLIR unit 12. To provide means for eliminating ghosts, a vidicon ghost logic algorithm 92 is provided. The vidicon ghost logic algorithm 92 is illustrated in FIG. 20 and will now be described in detail.

At step 244, the vidicon ghost logic algorithm 92 is initiated with the variable N equal to the number of current observations in the field i under consideration. After executing step 224, the vidicon ghost logic algorithm 92 executes step 246 which starts a loop which terminates after the loop has been executed a number of times to equal the number of prior fields for which ghosts are to be located. In general, it may be stated that it is desirable to go back one or two frames, depending on the vidicon phosphorescence decay period. After executing the step 246, the vidicon ghost logic algorithm 92 executes step 248 which is used to compute a compression factor. The compression factor is used to map the data appearing on field i to the data appearing on the prior fields (i.e., field L). Depending on whether a scan mirror or a scan wheel is used in the targeting FLIR unit 12, the following equations may be used to compute the compression factor:

for scan mirror:
   if regressing two fields (L=i−2): set S=1
   if regressing one field (L=i=1):

$$D=|\dot{A}|/F$$

if field i scan is in direction of azimuth pan:

$$S=(FOV-D)/(FOV+D)$$

if field i scan is against azimuth pan:

$$S=(FOV+D)/(FOV-D)\ \ D<FOV$$

for scan wheel: set S=1
where:
$\dot{A}$ = azimuth pan rate (degrees/sec.)
F = field rate (Hz)
FOV = FLIR azimuth FOV (degrees)

After executing step 248, the vidicon ghost logic algorithm 92 executes step 250 which begins a loop which is reiterated for each observation in the given field. After executing step 250, the vidicon ghost logic algorithm 92 executes step 252 which computes the predicted azimuth of the observation if the observation was a ghost of another field. To compute the predicted azimuth of the observation if the observation was a ghost of a prior field in step 252, the following equation is used:

$$Ag=S^{*}(A_j-A_s)+A_1$$

where:
$A_j$ = azimuth of observation j
$A_s$ = starting azimuth of field i (current field)
$A_1$ = starting azimuth of Field L (regressed field)

After executing step 252, the vidicon ghost logic algorithm 92 executes step 254 which initiates a loop which is reiterated a number of times equal the number of observations in the field i. After executing step 254, the vidicon ghost logic algorithm 92 executes step 256 which determines whether the predicted observation J is in a gate about observation K. If the observation J is in the same gate as the observation K, then it may be due to the same observation. Accordingly, the observation with the highest amplitude is selected. To execute step 256, the vidicon ghost logic algorithm 92 evaluates the following equations:

$$DA=|A_k-A_g|$$

$$DE=|E_k-E_j|\ \ \text{observation j is in gate if:}$$

$$DA \leq GA$$

$$DE \leq GE$$

where:
$A_k$ = azimuth of observation k (regressed field)
$E_k$ = elevation of observation k (regressed field)
$E_j$ = elevation of observation j (current field)

If the predicted observation J is not in a gate about observation K as determined by step 256, the vidicon ghost logic algorithm 92 executes the return step 258 which causes the vidicon ghost logic algorithm 92 to execute either step 254 or step 260 described below depending on whether all the observations in field L have been evaluated with respect to step 256. If at step 256, the predicted observation J is in the gate surrounding observation K, then the vidicon ghost logic algorithm 92 executes step 262. At step 262, the vidicon ghost logic algorithm 92 determines whether the amplitude of the observation J is less than the observation K. In performing step 262, the vidicon ghost logic algorithm 92 evaluates the following equation:

if $AMP_k-AMP_j > AMP_t{}^{*}AMP_k$ assume L is a ghost where:
$AMP_k$ = amplitude of regressed field observation
$AMP_j$ = amplitude of current field observation
$AMP_t$ = amplitude fraction If at step 262 the amplitude of observation J is not less than observation K, the vidicon ghost logic algorithm 92 executes the step 258 which causes the vidicon ghost logic algorithm 92 to execute either step 254 or step 260 as described above. If at step 262 the vidicon ghost logic algorithm 92 determines that the altitude of observation J is less than observation K, the vidicon ghost logic algorithm 92 executes step 264 which sets observation J to a ghost observation and exits the loop on K. After executing step 264, or upon termination of the loop K as determined by step 258, the vidicon ghost logic algorithm 92 executes step 260 which either returns processing to step 250 or to step 266 if all observations in the field have been processed. After all fields in the regress have been examined for ghosts, the vidicon ghost logic algorithm 92 executes step 268 which sends all non-ghost observations in the field to the TWS observation buffer 96.

2.2 FLIR Overscan Logic Algorithm

Figure 21:
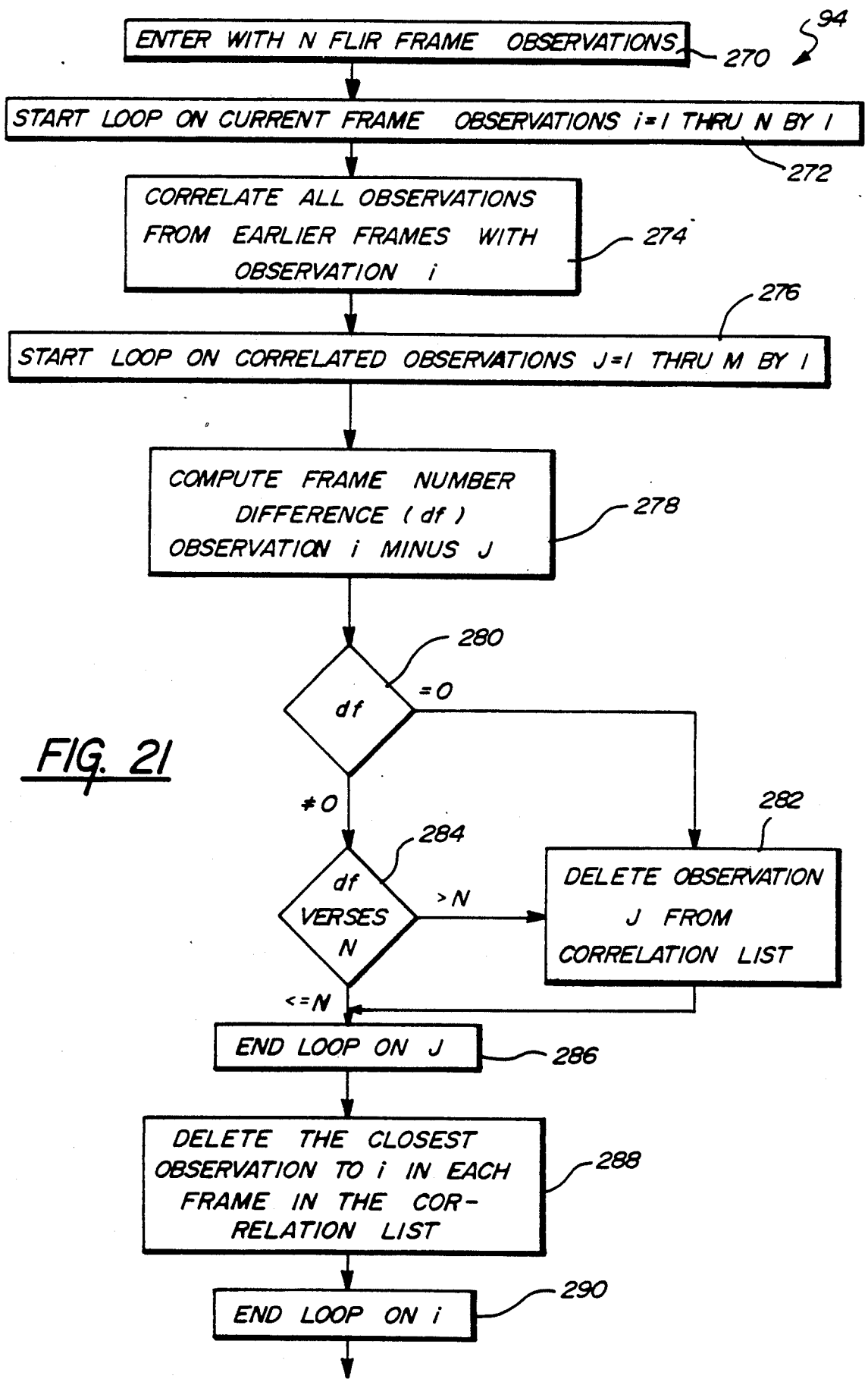
FIG. 21 illustrates the FLIR overscan logic algorithm used by the data processor as shown in FIG. 4.

During operation of the apparatus 10, a single target may result in multiple observations due to overscan of previous frames. To provide means for eliminating such observations caused by overscan, the FLIR overscan logic algorithm 94 is provided. The FLIR overscan logic algorithm 94 is used to create a gate around a current observation. After the gate is formed, the FLIR overscan logic algorithm 94 determines which prior observations fall within that gate, and deletes such observations from consideration. The FLIR overscan logic algorithm 94 will now be described with reference to FIG. 21.

The first step of the FLIR overscan logic algorithm 94, is step 270 in which the signal processor 74 provides the number of frame observations. After executing step 270 of the FLIR overscan logic algorithm 94, the step 272 is executed which initiates a loop which is reiterated by the number of frame observations. After executing step 272, the FLIR overscan logic algorithm 94 executes step 274 which correlates the observations from all earlier frames which could be overscanned with the current observation. The number of such frames M is usually 3 and is a function of the FLIR field-of-view and the gimbal scan rate. This correlation is performed by using the following algorithms:

If $|A_i-A_j| \leq GA$ and $|E_i-E_j| \leq GE$ then observation i and j are correlated.
Closeness is measured by:

$$D_{ij}=[(A_i-A_j)^2+(E_i-E_j)^2]$$

where:

$A_i$ = azimuth observation i
$E_i$ = elevation observation i
$A_j$ = azimuth observation j
$E_j$ = elevation observation j
GA = azimuth correlation gate
GE = elevation correlation gate
$D_{ij}$ = distance measure.

After executing step 274, the FLIR overscan logic algorithm 94 executes step 276 which initiates a loop for each correlated observation which was determined at step 274. After executing step 276, the FLIR overscan logic algorithm 94 executes step 278 which computes the frame number difference between the current observation and the correlated observation. It will be noted that the frame number of the current observation will always be greater than the frame number of the prior observation. After executing step 278, the FLIR overscan logic algorithm 94 executes step 280 which determines whether the frame number difference between the current observation and correlated observations is equal to zero. If the frame number of the current observation is equal to the frame number of the correlated observation, then the FLIR overscan logic algorithm 94 executes step 282 which deletes the possible prior observation from the correlation list related to the current observation which was created in step 274 (i.e., does not allow it to be deleted). If at step 280 the frame number difference between the current observation and the prior observation is not equal to zero, the FLIR overscan logic algorithm 94 executes step 284.

At step 284, the FLIR overscan logic algorithm 94 determines whether the frame number difference is greater than the number of previous possible overscan frames (M). If the frame number difference is greater than M, the FLIR overscan logic algorithm 94 executes step 282 which deletes the possible prior observation from the correlation list related to the current observation generated at step 274. If at step 284 the FLIR overscan logic algorithm 94 determines that the frame number difference is less than or equal to M, the FLIR overscan logic algorithm 94 executes step 286 which terminates the loop initiated at step 276. After executing step 286, the FLIR overscan logic algorithm 94 executes step 288 which deletes the closest observation to the current observation in each frame of the observations in the observations in the correlation list. After executing step 288, the FLIR overscan logic algorithm 94 reiterates step 272 by means of step 290 until the number of current frame observations has been reached.

2.3 Threshold Control Algorithm

The threshold control algorithm 110 is used for modifying each non-dense (i.e., non-clutter) threshold obtained by the clutter map threshold algorithm 80 to reflect current data processing resources. The threshold control algorithm 110 either raises the threshold generated by the clutter map threshold algorithm 80 or lowers the thresholds by one least significant bit depending on the available processing time remaining after the last scan of the current bar being processed. After all thresholds are computed, they are sent to the signal processor 74 for use with the clutter map threshold algorithm 80.

Figure 22:
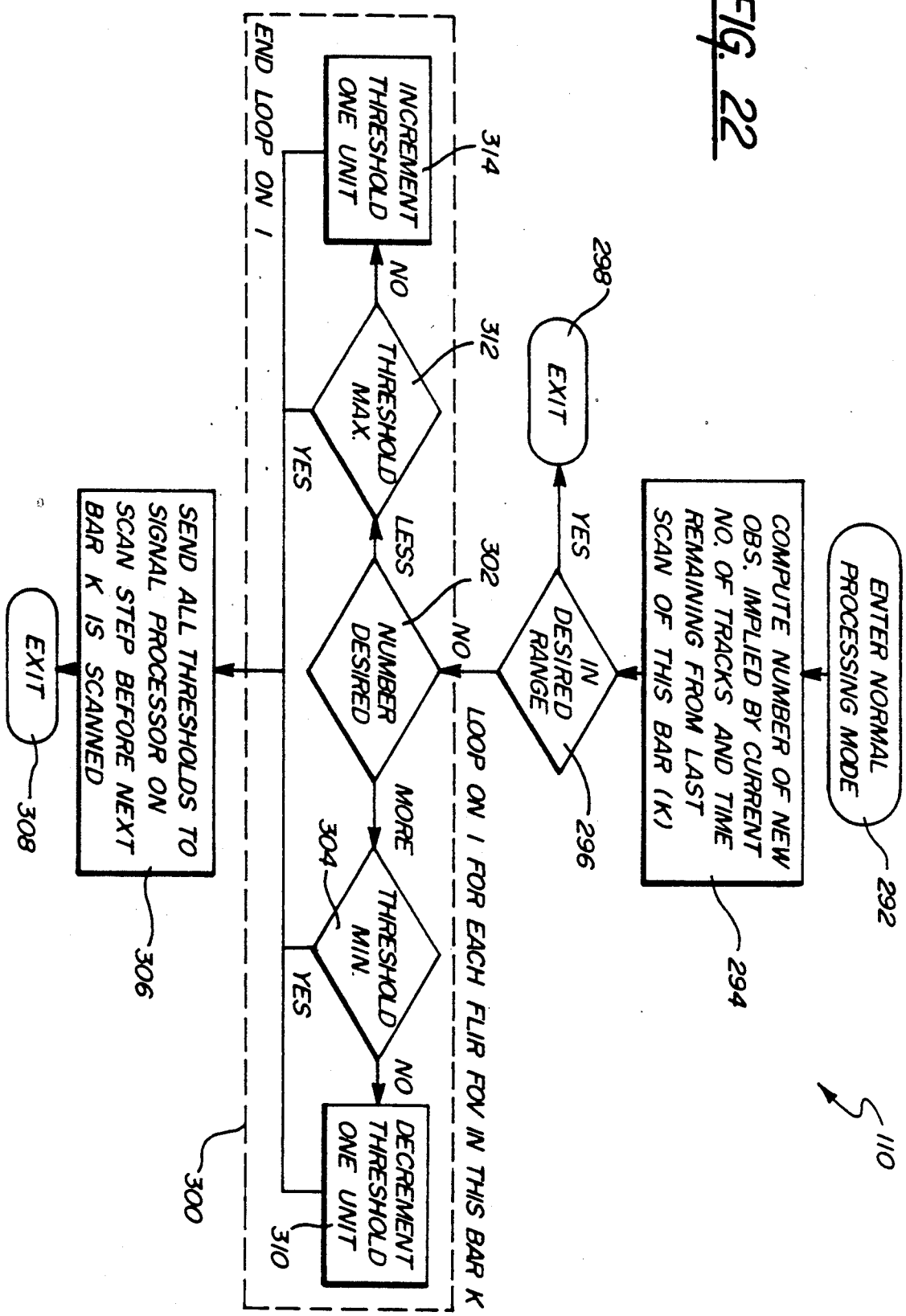
FIG. 22 illustrates the operation of the threshold control algorithm used by the data processor as shown in FIG. 4.

The operation of the threshold control algorithm 110 in FIG. 22, comprises the step 292 which is the entry point during normal processing. From step 292, the threshold control algorithm 110 executes step 294 which computes the number of new observations implied by the current number of tracks and the time remaining from the last computer processing cycle as explained below. After step 294 has been executed, the threshold control algorithm 110 executes step 296 which determines whether the number of new observations is in the desired range as determined by the time remaining in the processing cycle. If the number of new observations is within the desired range, then the threshold control algorithm 110 is terminated at step 298.

If the number of new observations as determined at step 296 is not within the desired range algorithm, the threshold control algorithm 110 executes the loop designated by the numeral 300 for each field-of-view in the bar under consideration. The first step executed in the loop 300 is the step 302, which determines whether the number of new observations computed at step 294 is either more or less than the desired number of observations. If the number of new observations is greater than the number of desired observations, the threshold control algorithm 110 executes step 304 which determines whether the threshold is equal to the minimum threshold. If the threshold is equal to the minimum threshold, the threshold control algorithm 110 either executes step 302 for the next FLIR field-of-view or executes step 306 if the loop 300 has been executed for each FLIR field-of-view. At step 306, the threshold control algorithm 110 sends all thresholds for each sector to the signal processor 74 before the next bar is scanned. After executing step 306, the threshold control algorithm 110 is terminated via the step 308.

If at step 304 the threshold control algorithm 110 determines that the minimum threshold has not been reached, step 310 is executed which decrements the threshold by one least significant bit. From step 310, the threshold control algorithm 110 either executes step 302 for the next FLIR field-of-view or executes step 306 if the loop 300 has been executed for each FLIR field-of-view.

If at step 302 the threshold control algorithm 110 determines that the number of new observations calculated at step 294 is less than the desired number of observations, the threshold control algorithm 110 executes step 312. At step 312, the threshold control algorithm 110 determines whether the threshold is equal to the maximum threshold. If the threshold is equal to the maximum threshold, the threshold control algorithm 110 executes either step 302 for the next FLIR field-of-view or step 306 if loop 300 has been executed with respect to each FLIR field-of-view.

If at step 312, the threshold control algorithm 110 determines that the maximum threshold has not been reached, the threshold control algorithm 110 executes step 314 which increments the threshold by one least significant bit. After executing step 314, the threshold control algorithm 110 either executes step 302 for the next FLIR field-of-view, or executes step 306 if the loop 300 has been executed with respect to each FLIR field-of-view.

The required processing time for a computer processing cycle is approximately related to the number of tracks and number of new observations per cycle by the following equation:

$$T = A + B(NT)(NO)$$

where:
T = total scan processing time
A = constant overhead time

B=system constant
NT=number of tracks
NO=number of new scan observations.

The inverse of the above expression is used to compute the expected number of observations that can be accepted for processing as $NO=(T-A)/NT$.

Transients in the complexity of the iterative scan-to-scan correlation tasks will vary actual capability around the number of expected observations. These variations are caused by the frequency of multi-observation correlations and the number of such observations in a multiple correlation that must be resolved. Other variations in execution time may occur because of random control interrupts, etc. The total derivative of the observation expression with respect to time implies that the change in observations ($\Delta NO$) with respect to the change in time ($\Delta T$) is $\Delta T/NT$. If the time difference between a desired process time and the time remaining after the current scan processing is called $\Delta T$, then the change in the current number of observations necessary to attain that desired time can be estimated by the evaluating of the above equation for $\Delta NO$. The total number of observations in which it is desired to add or subtract from a scan are then distributed by FLIR field-of-view sector, based on number of tracks in each sector. Each sector amplitude is raised by a sensor dependent standard amount (i.e., one least significant bit) if less than the current number of observations are desired. Each non-dense sector threshold is lowered by a sensor dependent standard amount if a larger number of observations are desired.

2.4 Track Acquisition Algorithm

The tracking process involves the use of the three major algorithms: track association algorithm 100, track filter algorithm 102, and track acquisition algorithm 108. These algorithms operate on the information contained in the track file which is classified as either tentative tracks, target (or firm) tracks, or clutter tracks. Tentative tracks are tracks which either do not have a sufficient number (i.e., three) of consecutive scan observations or which do not have a sufficient number of total associated scans to be considered a target track. Clutter tracks are former target tracks that have been classified as clutter by the track classification algorithm 104. Target tracks are processed first, followed by tentative tracks and clutter tracks. After all current tracks have been processed, new tracks may be formed by the track association algorithm 100 described below. This procedure is followed to allow prioritized graceful degradation of processing in case of processor overload. Two passes through the track acquisition algorithm are used, the second pass cycling through the correlated observation step in the inverse order to the first.

Figure 23:
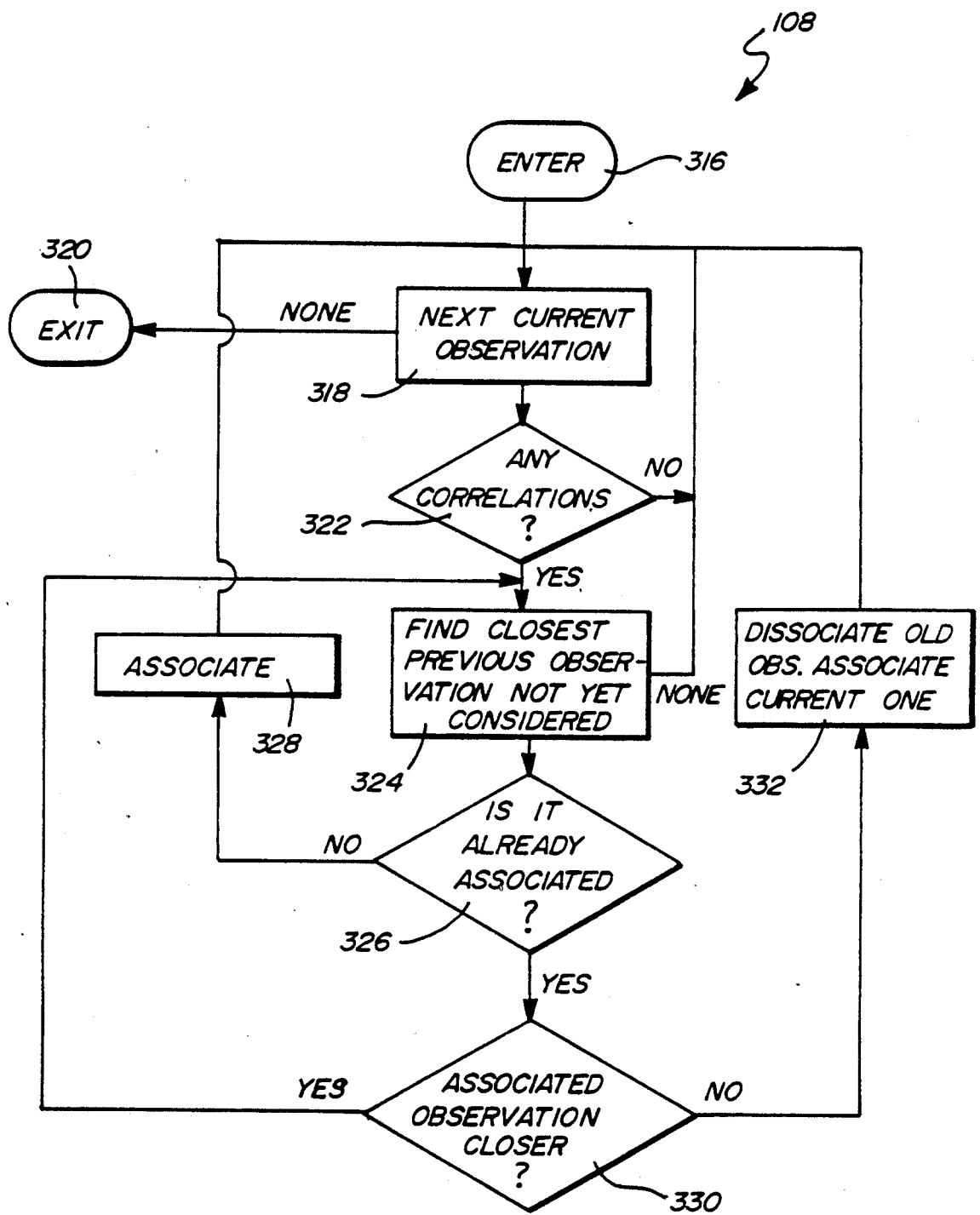
FIG. 23 illustrates the track acquisition algorithm used by the data processor as shown in FIG. 4.
Figure 24:
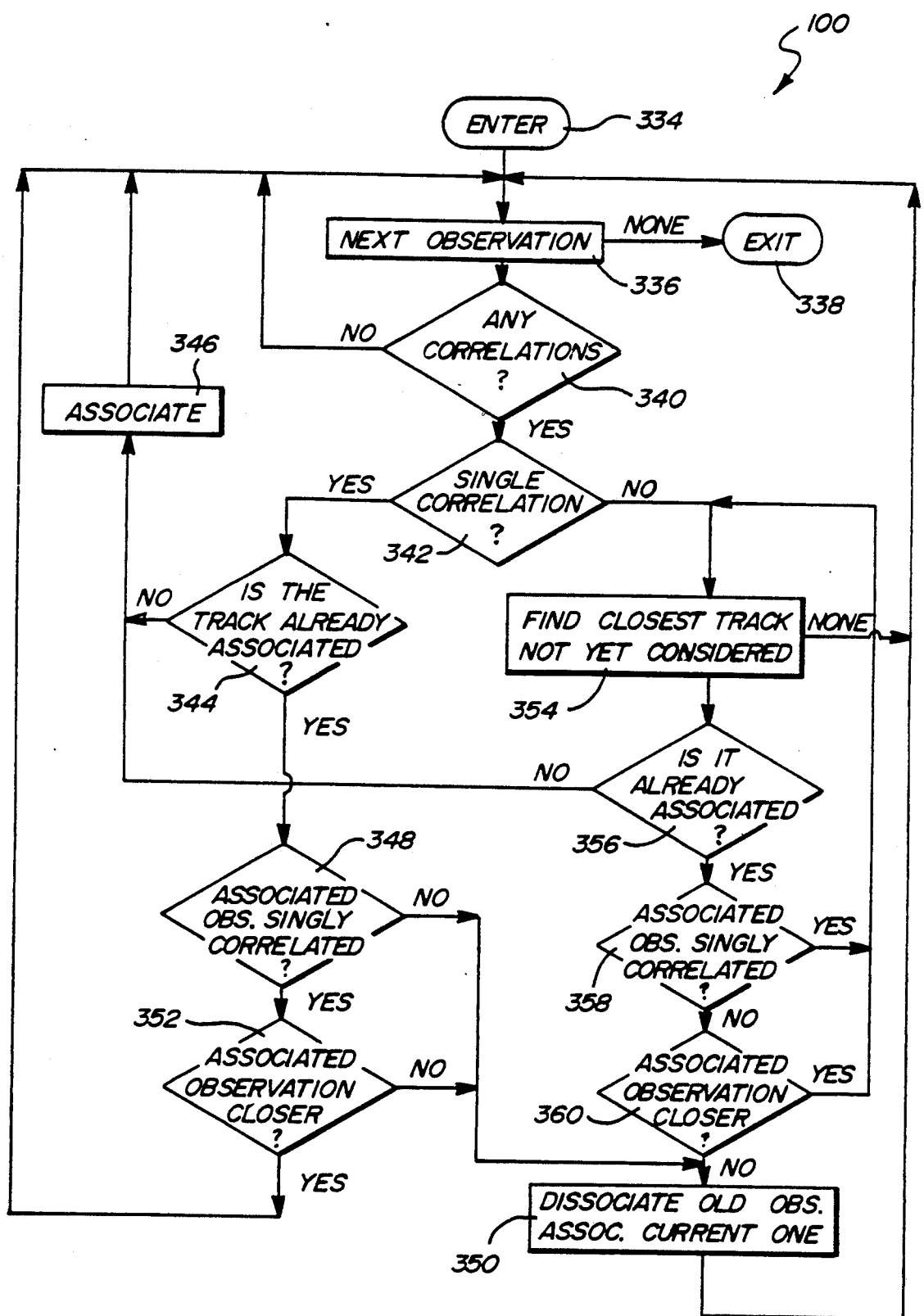
FIG. 24 illustrates the track association algorithm used by the data processor as shown in FIG. 4.

To provide means for forming tracks, the track acquisition algorithm 108 is provided. The track acquisition algorithm 108 will now be described in greater detail with reference to FIG. 23. The track acquisition algorithm 108 is used to form tentative tracks by associating two consecutive scan observations. Processing begins at step 316 when the processing associated with the track acquisition algorithm 110 is begun. The step 318 is then executed which obtains the new current observation. If at step 318 the track acquisition algorithm 108 determines that all current observations have been processed, the track acquisition algorithm 108 is terminated via the exit step 320. If there are further observations to be processed, the track acquisition algorithm 108 executes step 322. At step 322, the track acquisition algorithm 108 determines whether there is any correlation between the current observation and the previous observation. The current observation is correlated with the previous observation when:

$$|AO-AP| \leq G_A$$

and $$|EO-EP| \leq G_E$$

where:
$G_A$=azimuth gate width=$C_A (\sigma_{MA}^2 + \sigma_{AO}^2)^{\frac{1}{2}}$
$G_E$=elevation gate width=$C_E (\sigma_{ME}^2 + \sigma_{EO}^2)^{\frac{1}{2}}$
$C_A$=azimuth gate size multiplier
$C_E$=elevation gate size multiplier
$\sigma_{MA}^2$=maximum target motion variance in azimuth
$\sigma_{ME}^2$=maximum target motion variance in elevation
$\sigma_{AO}^2$=azimuth observation variance
$\sigma_{EO}^2$=elevation observation variance
AO=current observation azimuth
EO=current observation elevation
AP=previous observation azimuth
EP=previous observation elevation.

All the constants used in the computation of acquisition gates are determined by simulation of various target engagements.

If there are no correlations between the current observation and the previous observation, then the track acquisition algorithm 108 executes step 318 to process the next observation. If there are correlations between the current observation and the previous observation, the track acquisition algorithm 108 executes step 324 which finds the closest previous observation which has not been considered. To determine the closest previous observation which has not been considered, the track acquisition algorithm 108 uses a nearest neighbor approach in which distance between observations is determined by the following equation:

$$D = \frac{(AO-AP)^2}{\sigma_{MA}^2 + \sigma_{AO}^2} + \frac{(EO-EP)^2}{\sigma_{ME}^2 + \sigma_{EO}^2}$$

If there are not prior observations which have not been considered, then the track acquisition algorithm 108 executes step 318 to process the next observation. If the track acquisition algorithm 108 locates the closest previous observation which has not been considered, the track acquisition algorithm 108 executes step 326. At step 326, the track acquisition algorithm 108 determines whether the closest previous observation as determined by step 324 has already been associated with a particular track. If the closest previous observation has not been associated with a particular track as determined at step 326, the track acquisition algorithm 108 executes step 328 which associates the closest previous observation with the current observation. The track acquisition algorithm 108 then executes step 318 in which the next current observation is processed.

If at step 326 the track acquisition algorithm 108 determines that the closest previous observation which has not been considered has already been associated, the track acquisition algorithm 108 executes step 330. At step 330, the track acquisition algorithm 108 determines whether the associated observation which is closer to the current observation than the observation which is associated with the previous observation. If the associated observation is closer to the current observation than the previous observation, the track acquisition algorithm 108 then executes step 324. If at step 330 the track acquisition algorithm 108 determines that the associated observation is not closer to the current observation than the previous observation, the track acquisition algorithm 108 executes step 332 which disassociates the previous observation from the associated observation and associates the current observation with the associated observation. The track acquisition algorithm 108 then executes step 318 in which the next observation is processed.

2.5 Track Association Algorithm

As discussed above, target tracks are those that have three or more consecutive observations which are associated. To provide means for assigning observations to established tracks, the track association algorithm 100 is provided. The track association algorithm 100 is used to assign new scan observations to established tracks for filtering purposes. In doing so, the track association algorithm 100 gives preference to tracks correlating with only one observation when resolving multiple associations. Further, track association algorithm 100 reduces false alarms by removing observations of established tracks from consideration as new targets. In addition, the track association algorithm 100 increases the recognition of new and therefore unassociated targets.

Figure 4:
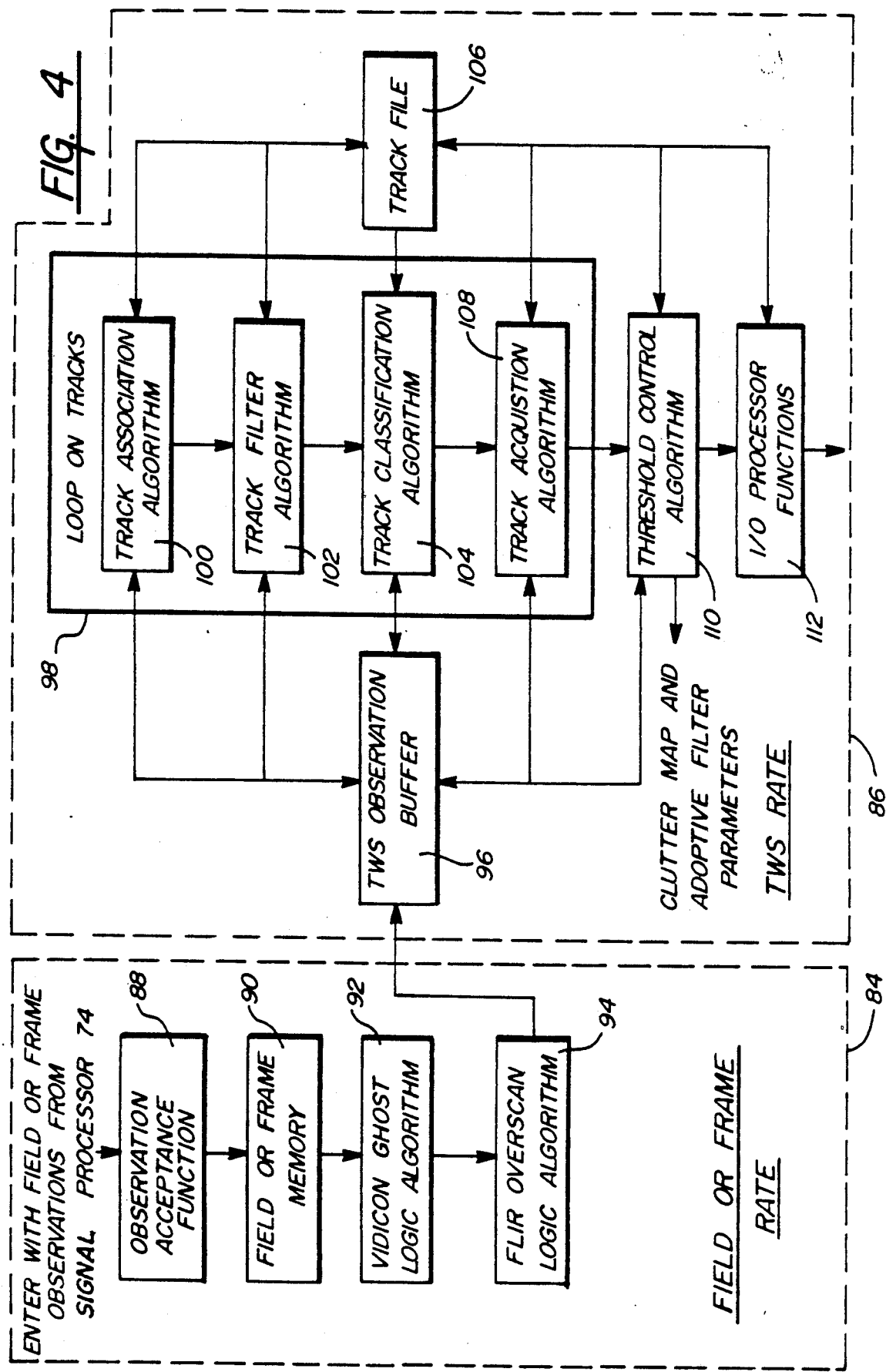
FIG. 4 illustrates the functional relationship between the algorithms used by the data processor shown in FIG. 1.

The operation of the track association algorithm 100 will now be described with reference to FIG. 4. After the track association algorithm 100 is entered at step 334, step 336 is executed which obtains the next observation to be processed. If all observations have been processed, the track association algorithm 100 is terminated at step 338. If there are further observations which have not been processed by the track association algorithm 100, the track association algorithm 100 executes step 340 which determines whether there are any correlations between the observation and the predicted track. A track is correlated with an observation when the following equations are satisfied:

$$|AO - AP| \leq G_A$$

and $$|EO - EP| \leq G_E$$

and $$|IO - IP| \leq G_I$$

where $$G_A = C_A (\sigma_{AP}^2 + \sigma_{AO}^2)^{\frac{1}{2}}$$

$$G_E = C_E (\sigma_{EP}^2 + \sigma_{EO}^2)^{\frac{1}{2}}$$

$$G_I = C_I A_T$$

$$\sigma_{AP}^2 = (\Lambda_{PE}^2 \sigma_{PN}^2 + \Lambda_{PN}^2 \sigma_{PE}^2)/(\Lambda_{PN}^2 \Lambda_{PE}^2)^2$$

$$\sigma_{EP}^2 = \sigma_{PD}^2/(1 - \Lambda_{PD}^2)$$

$$\begin{pmatrix} AO \\ EO \\ IO \end{pmatrix} = \text{observation azimuth, elevation and amplitude}$$

$$\begin{pmatrix} AP \\ EP \\ IP \end{pmatrix} = \text{predicted track azimuth, elevation and amplitude}$$

$G_A$ = azimuth gate width
$G_E$ = elevation gate width
$C_I$ = amplitude gate percentage multiplier
$G_I$ = amplitude gate size
$C_A$ = azimuth gate size multiplier
$C_E$ = elevation gate size multiplier
$\sigma_{AP}^2$ = predicted track azimuth variance
$\sigma_{AO}^2$ = azimuth observation variance
$\sigma_{EP}^2$ = predicted track elevation variance
$\sigma_{EO}^2$ = elevation observation variance
$A_T$ = current target amplitude $$\begin{pmatrix} \Lambda_{PN} \\ \Lambda_{PE} \\ \Lambda_{PD} \end{pmatrix} = \Lambda_P = \text{predicted track direction cosine vector}$$

$$\begin{pmatrix} \sigma_{PN}^2 \\ \sigma_{PE}^2 \\ \sigma_{PD}^2 \end{pmatrix} = \text{predicted track variances in direction cosine coordinates}$$

$$\begin{pmatrix} \sigma_{AP}^2 \\ \sigma_{EP}^2 \end{pmatrix} = \text{predicted track variances in azimuth and elevation}$$

If the current observation cannot be correlated with an existing track as determined by step 340, the track association algorithm 100 executes step 336 in which the next observation is processed. If there exists at least one correlation between the observation under consideration and potential tracks as determined by step 340, the track association algorithm 100 executes step 342. At step 342, the track association algorithm 100 determines whether there is a single correlation or multiple correlation. If there is a single correlation, the track association algorithm 100 executes step 344 which determines whether the track which was correlated with the current observation in step 340 has been associated with another track. If the track which has been correlated with the current observation has not been associated, then the track association algorithm 100 executes step 346 which associates the current observation with the track to which it is correlated. The track association algorithm 100 then executes step 336 in which a new observation is processed.

If at step 344 the track association algorithm 100 determines that the track which has been correlated to the observation has already been associated, the track association algorithm 100 executes step 348 which determines whether the prior observation which has already been associated with the track correlated with other observations. If the prior observation is not singly correlated, the track association algorithm 100 executes step 350 which disassociates the prior observation from the track and associates the current observation with the track. The track association algorithm 100 then processes the next observation via step 336.

If at step 348 the track association algorithm 100 determines that the prior observation which is associated with the track is singly correlated, the track association algorithm 100 executes step 352. At step 352, the track association algorithm 100 determines whether the prior observation is closer to the associated track than the current observation. The distance measure for use by the track association algorithm 100 for determining the closest observation is:

$$D = \frac{(A_O - A_P)^2}{\sigma_{AP}^2 + \sigma_{AO}^2} + \frac{(E_O - E_P)^2}{\sigma_{EP}^2 + \sigma_{EO}^2}$$

All the constants used in the computation of association gates will be determined by simulation of various target engagements.

If the prior observation is closer to the associated track than the current observation as determined at step 352, the track association algorithm 100 then executes step 336 to begin processing a new observation. If the prior observation is farther from the track than the current observation, then the track association algorithm executes step 350 which disassociates the prior observation from the track and associates the new observation with the track. After executing step 350, the track association algorithm 100 executes step 336.

If at step 342 the track association algorithm 100 determines that the current observation is correlated with more than one track, the track association algorithm 100 executes step 354. At step 354, the track association algorithm 100 locates the closest track which has not been considered by the track association algorithm 100. If all tracks have been considered, the track association algorithm 100 executes step 336 in which a new observation is considered. If at step 354 the track association algorithm 100 locates the closest track which is not being considered, the track association algorithm 100 executes step 356. If at step 356 the track association algorithm 100 determines that the track has not been already associated, the track association algorithm 100 executes step 346 which associates the track with the observation. If at step 356 the track association algorithm 100 determines that the closest track has already been associated, the track association algorithm 100 executes step 358 which determines whether the prior observation associated with the track is associated with other tracks. If at step 358 the track association algorithm 100 determines that the prior observations are correlated with other tracks, the track association algorithm 100 executes step 360. If at step 358 the track association algorithm 100 determines that the prior observation is correlated with a single track, the track association algorithm 100 executes step 354.

At step 360, the track association algorithm 100 determines whether the prior observation which is associated with the track is closer than the current observation. If the prior observation is closer to the track than the present observation, then the track association algorithm 100 executes step 342. If the prior observation is farther from the track, then the track association algorithm 100 executes step 350 in which the old observation is disassociated from the track while the current observation becomes associated with the track. The track association algorithm 100 then executes step 336 in which a new observation is processed.

2.6 Track Filter Algorithm

As discussed above, the track filter algorithm 102 is used for smoothing and/or predicting target, tentative or clutter tracks. A separate filter implementation is used for filtering tentative tracks than that which is used for target and clutter tracks. The track filter algorithm 102 used for filtering tentative tracks comprises two constant gain filters which are implemented in azimuth and elevation coordinates respectively. The smoothing equations associated with each filter are as follows:

$$A_s = \alpha_{A1} A_P + \beta_{A1}(A_O - A_P)$$

$$E_s = \alpha_{E1} E_P + \beta_{E1}(E_O - E_P)$$

$$\dot{A}_s = \alpha_{A2} \dot{A}_P + \beta_{A2}(A_O - A_P)/\Delta t$$

$$\dot{E}_s = \alpha_{E2} \dot{E}_P + \beta_{E2}(A_O - A_P)/\Delta t$$

where:
$A_s, \dot{A}_s$ = smoothed azimuth and azimuth rate
$E_s, \dot{E}_s$ = smoothed elevation and elevation rate
$A_P, \dot{A}_P$ = predicted azimuth and azimuth rate
$E_P, \dot{E}_P$ = predicted elevation and elevation rate
$\alpha_{A1}, \beta_{A1}, \alpha_{A1}, \beta_{A2}$ = azimuth gain constants
$\alpha_{E1}, \beta_{E1}, \alpha_{E2}, \beta_{E2}$ = elevation gain constants
$\Delta t$ = observation/predict time interval.

The equations which are used by the track filter algorithm 102 to predict tracks are as follows:

$$A_P = A_s + \dot{A}_s \Delta t$$

$$E_P = E_s + \dot{E}_s \Delta t$$

$$\dot{A}_P = \dot{A}_s$$

$$\dot{E}_P = \dot{E}_s$$

The track filter algorithm 102 for use in filtering target tracks or clutter tracks will now be described. Once the track classification algorithm determines that an observation represents a target track or a clutter track, the associated azimuth and elevation of the observation are converted to direction cosine coordinates observations according to the following relationship:

$$\begin{pmatrix} \Lambda_N \\ \Lambda_E \\ \Lambda_D \end{pmatrix} = \begin{matrix} \cos A \cos E \\ \sin A \cos E \\ -\sin E \end{matrix} = \overline{\Lambda}$$

The target filter algorithm 102 used for filtering target tracks or clutter tracks uses three separate Kalman filters for each coordinate axis (i.e., north, east, and down). Three state parameters (direction cosine (DC), DC velocity, and DC acceleration) are estimated by each Kalman filter. The three separate state estimation vectors are:

$$X_N = \begin{bmatrix} \Lambda_N \\ v_{tN} \\ a_{tN} \end{bmatrix}, X_E = \begin{bmatrix} \Lambda_E \\ v_{tE} \\ a_{tE} \end{bmatrix}, X_D = \begin{bmatrix} \Lambda_E \\ v_{tD} \\ a_{tD} \end{bmatrix}$$

where
$\Lambda_N$ = north direction cosine (DC)
$v_{tN}$ = north component of target DC velocity
$a_{tN}$ = north component of target DC acceleration.
Similar definitions apply for $X_E$ and $X_D$ for the east and down axes.

the generalized equations for three angle filters are based on:

system equation: $Z_n = H\, X_n + N_n$ state equation: $X_n = \Phi_{n1}\, X_{n-1}$ where:
$Z_n = 1 \times 1$ observed direction cosine
$H = 1 \times 3$ state coefficient matrix
$X_n = 3 \times 1$ state variable vector
$N_n = 1 \times 1$ gaussian noise source
and $\Phi_{n-1} = 3 \times 3$ state transition matrix.

The filter equations are then given by:

$K(n) = P(n)\, H^T\, H\, P(n)\, [H^T + \sigma_m^2]^{-1}$ $X_s(n) = \hat{X}(n) + K(n)\, [Z(n) - H\, \hat{X}(n)]$ $\hat{X}(n+1) = \Phi(n)\, X_s(n) + \hat{F}(n+1/n)$ $P(n+1) = \Phi(n)\, [I - K(n)\, H] P(n)\, \Phi^T(n) + Q(n)$ where:
$K(n) = 3 \times 1$ Kalman gain vector
$P(n) = 3 \times 3$ error covariance matrix
$\sigma_m^2 = 1 \times 1$ Gaussian noise variance
$X_s(n) = 3 \times 1$ smoothed state vector
$X(\hat{n}) = 3 \times 1$ estimation state vector
$\hat{F}(n+1/n) = 3 \times 1$ aiding matrix
$Q(n) = 3 \times 3$ random driving matrix
time n is the current time.

In addition to the filtering which the track filter algorithm 102 performs, the track filter algorithm 102 also is used to transform the azimuth and elevation of the sensor coordinates to the coordinates of the platform with which the sensor is used. For example, a ground base sensor having no motion components would have a transformation which converted azimuth and elevation of the sensor to northeast and downward direction cosines. The transformation performed by the track filter algorithm 102 in this regard is dependent on the specific implementation, and has been developed for various platforms and inertial navigation units and sensors.

2.7 Observation Acceptance Function

The observation acceptance function 88 accepts observations from the signal processor 74. An observation includes time of occurrence, detector line number, azimuth and amplitude. The observation acceptance function 88 assigns observation memory pointers to each observation to allow more efficient later processing and conversion of scan field and scan line information to actual elevation based on gimbal resolver outputs and vidicon synchronization signals. A single link-list software data structure is preferably used to provide memory pointers. The exact format and units of the input observations are application dependent.

2.8 I/O Processor Functions

The I/O processor functions 112 performs the communication function between the signal processor 74, the servo interface unit 50, and the systems electronics unit 16. The I/O processor function 112 interrogates stored memory for new observations and/or system control provided by the systems electronics unit 16 and other elements of the IEU 40. The I/O processor functions 112 are application specific but generally monitor and control communications to and from the data processor 76 as well as other components of the apparatus 10.

2.9 Track Classification Algorithm

To provide means for classifying tracks, the track classification algorithm 104 is provided. The track classification algorithm 104 is used for determining the threat level of the track and determine whether the track is a target track or a clutter track. In doing so, the track classification algorithm 104 examines the radiometric and track state parameters associated with each target or clutter track during the tracking cycle. These parameters are then compared to a known set of parameters for a particular type of threat. Various threat comparison methods exists, some of which are disclosed in Blackman, Samuel S., *Multiple Targeting With Radar Applications*, Artech House, Dedham, Mass. (1986) at 281-305, 402-421, which is hereby incorporated by reference.

It should be understood that the present invention was described in connection with one specific embodiment. For example, the clutter map threshold algorithm may be performed by the data processor rather than the signal processor. Other modifications will become apparent to one skilled in the art upon study of the specification, drawings and claims.

What is claimed is:

1. An apparatus for each search and simultaneously tracking multiple moving and nonmoving targets in an object space comprising:
    a targeting FLIR unit operating in imaging mode, said targeting FLIR unit generating an electrical output in response to observations of said multiple moving and nonmoving targets; and
    means for detecting and tracking said multiple moving and nonmoving targets in response to said electrical output of said targeting FLIR unit.

2. The apparatus of claim 1, wherein said means for detecting and tracking said multiple targets comprises a signal processor and a data processor.

3. The apparatus of claim 2, wherein each of said targets forms at least one observation, and wherein said signal processor comprises:
    means for generating an adaptive threshold; and
    means for limiting the number of observations processed by said data processor.

4. The apparatus of claim 3, wherein said signal processor comprises means for compensating for multiple exceedances of said adaptive threshold from the same target.

5. The apparatus of claim 2, wherein said data processor comprises:
    means for generating tracks from the output of said signal processor; and
    means for classifying said tracks into target tracks, tentative tracks, and clutter tracks.

6. The apparatus of claim 5, wherein said data processor further comprises means for assigning new observations to existing tracks.

7. The apparatus of claim 2, wherein said data processor further comprises means for eliminating ghosts generated by said targeting FLIR unit.

8. The apparatus of claim 2, wherein said data processor comprises means for deleting observations of said targets which are generated by overscan of said targets by said targeting FLIR unit.

9. An apparatus for allowing an operator to continuously search and track a plurality of targets moving in an object space comprising:
a targeting FLIR unit operating in imaging mode, said targeting FLIR unit operable to generate a first output in response to observations of said plurality of targets;
a system electronics unit for controlling the operation of said targeting FLIR unit;
a monitor for displaying a portion of said object space to said operator, said monitor electrically communicating with said system electronics unit;
a signal processor electrically communicating with said system electronics unit; and
a data processor electrically communicating with said signal processor and said systems electronics unit, said data processor comprising:
means for forming tracks from the first output of said targeting FLIR unit,
means for assigning said observations to established tracks operable to generate a second output,
means for filtering the output of said means for assigning observations to established tracks,
means for classifying said tracks into target tracks, tentative tracks, and clutter tracks,
means for eliminating ghosts generated by said targeting FLIR unit, and
means for deleting observations of said targets which are generated by overscan of said targets by said targeting FLIR unit.

10. The apparatus of claim 9, wherein said signal processor comprises:
means for generating an adaptive threshold operable to reduce the possibility that said apparatus will identify natural backgrounds as targets; and
means for generating a clutter map threshold operable to limit the number of observations which are processed by said data processor.

11. The apparatus of claim 10, wherein means for generating an adaptive threshold comprise:
a target filter operable to generate a third output;
a guard filter operable to generate a fourth output; and
means for determining whether said third output of said target filter exceeds both said clutter map threshold as well as said fourth output of said guard filter.

12. The apparatus of claim 11, wherein said means for generating a clutter map threshold is operable to:
calculate the number of observations which exceed a predetermined threshold;
determine whether the number of observations which exceed said predetermined threshold is within a desired band;
raise said threshold if the number of observations which exceed said predetermined threshold is greater than the upper limit of said desired band; and
lower said predetermined threshold if the number of observations which exceed said predetermined threshold is less than the lower limit of said desired band.

13. The apparatus of claim 12, wherein said signal processor further comprises means for compensating for multiple exceedances of said adapative threshold from the same target.

14. The apparatus of claim 9, wherein said means for forming tracks comprises a track acquisition algorithm.

15. The apparatus of claim 14, wherein said means for assigning observations to established tracks comprises a track association algorithm.

16. The apparatus of claim 15, wherein said means for filtering comprises a track filter algorithm.

17. The apparatus of claim 16, wherein said means for classifying said tracks comprises a track classification algorithm.

18. The apparatus of claim 17, wherein said means for eliminating ghosts comprises a vidicon ghost logic algorithm.

19. The apparatus of claim 18, wherein said means for deleting observations comprises a FLIR overscan logic algorithm.

20. A method for searching and simultaneously tracking a plurality of moving and nonmoving targets in an object space comprising:
sensing said targets using a targeting FLIR unit operating in an imaging mode, said targeting FLIR unit operable to operable an electrical output; and
processing said electrical output from said targeting FLIR unit to allow search and simultaneously tracking of said plurality of moving and nonmoving targets.

21. The method of claim 20, wherein said step of processing the output from said targeting FLIR unit further comprises the step of executing an adaptive threshold algorithm.

22. The method of claim 21, wherein said step of processing the output of said targeting FLIR unit further comprises the step of executing a clutter map threshold algorithm.

23. The method of claim 22, wherein said step of processing the output of said targeting FLIR unit further comprises the step of executing a peak detection algorithm.

24. The method of claim 23, wherein said step of processing the output of said targeting FLIR futher comprises the step of executing a track association algorithm.

25. The method of claim 24, wherein said step of processing the output of said targeting FLIR unit further comprises the step of executing a track classification algorithm.

26. The method of claim 25, wherein said step of processing the output of said targeting FLIR unit further comprises the step of executing a track acquisition algorithm.

27. The method of claim 26, wherein said step of processing the output of said targeting FLIR unit further comprises the step of executing an observation acceptance function.

28. The method of claim 27, wherein said step of processing the output of said targeting FLIR unit comprises the step of executing a vidicon ghost logic algorithm.

29. The method of claim 28, wherein said step of processing the output of said targeting FLIR unit further comprises the step of executing a FLIR overscan logic algorithm.

30. The method of claim 20, wherein said step of sensing said targets using a targeting FLIR unit comprises the step of panning said targeting FLIR unit.

* * * * *

UNITED STATES PATENT AND TRADEMARK OFFICE
CERTIFICATE OF CORRECTION

PATENT NO. : 5,001,650
DATED : March 19, 1991
INVENTOR(S) : W. LEON FRANCIS, PAUL T. GRAY and WALTER G. MARGERUM It is certified that error appears in the above-identified patent and that said Letters Patent is hereby corrected as shown below:

Column 29, lines 22 and 24, delete "system" and substitute therefor --systems--.

Column 30, line 27, delete "operable" (second occurrence) and substitute therefor --generate--.

Column 30, line 58, after the word "unit" insert the word --further--.

Signed and Sealed this

Ninth Day of November, 1993

Attest:

BRUCE LEHMAN

Attesting Officer    Commissioner of Patents and Trademarks